(12) United States Patent
Rudy et al.

(10) Patent No.: US 6,193,584 B1
(45) Date of Patent: Feb. 27, 2001

(54) APPARATUS AND METHOD OF DEVICE STRIPE HEIGHT CONTROL

(75) Inventors: Steven C. Rudy, San Jose; Curtis V. Macchioni, Livermore, both of CA (US); Yong Shen, Tai Po, Nt (HK); Billy W. Crue, Jr., San Jose, CA (US); Michael T. Harnischfeger, Union City, CA (US); Steven J. Plewes, San Jose, CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/321,486

(22) Filed: May 27, 1999

(51) Int. Cl.[7] ..................................................... B24B 1/00
(52) U.S. Cl. ................................. 451/5; 451/41; 451/10; 29/593; 29/603.16
(58) Field of Search .............................. 457/1, 28, 5, 9, 457/10, 11, 41; 29/603.09, 603.16, 603.17, 593

(56) References Cited

U.S. PATENT DOCUMENTS

| | | |
|---|---|---|
| Re. 35,291 | 7/1996 | Lafond . |
| 4,196,411 | 4/1980 | Kaufman . |
| 4,511,942 | 4/1985 | Valstyn . |
| 4,559,743 | 12/1985 | Kracke et al. . |
| 4,670,732 | 6/1987 | Church . |
| 4,675,986 | 6/1987 | Yen . |
| 4,689,877 | 9/1987 | Church . |
| 4,739,562 | 4/1988 | Kracke et al. . |
| 4,841,625 | 6/1989 | Valstyn . |
| 4,914,868 * | 4/1990 | Church et al. ............................ 451/5 |
| 5,065,483 | 11/1991 | Zammit . |
| 5,175,938 * | 1/1993 | Smith ..................................... 33/567 |
| 5,208,714 * | 5/1993 | Denison et al. ...................... 360/113 |
| 5,210,667 | 5/1993 | Zammit . |
| 5,311,385 | 5/1994 | Schwarz et al. . |
| 5,312,644 | 5/1994 | Schwarz et al. . |
| 5,361,547 * | 11/1994 | Church et al. ............................ 451/5 |
| 5,463,805 * | 11/1995 | Mowry et al. ......................... 29/603 |
| 5,494,473 | 2/1996 | Dupuis et al. . |
| 5,531,017 | 7/1996 | Church et al. . |
| 5,532,892 | 7/1996 | Nix et al. . |
| 5,588,199 | 12/1996 | Krounbi et al. . |
| 5,597,340 | 1/1997 | Church et al. . |
| 5,620,356 | 4/1997 | Lackey et al. . |
| 5,654,854 | 8/1997 | Mallary . |
| 5,678,086 | 10/1997 | Gandola et al. . |
| 5,680,281 | 10/1997 | Kung et al. . |
| 5,708,370 | 1/1998 | Shibata et al. . |
| 5,722,155 | 3/1998 | Stover et al. . |
| 5,738,566 * | 4/1998 | Li et al. ................................. 451/28 |
| 5,772,493 * | 6/1998 | Rottmayer et al. ....................... 451/5 |
| 5,861,890 * | 10/1998 | Hao et al. ................................. 451/5 |
| 5,911,455 * | 6/1999 | Draaisma et al. ................. 29/603.07 |
| 5,991,698 * | 11/1999 | Hao et al. .............................. 702/65 |
| 5,997,381 * | 12/1999 | Dee et al. ................................. 451/5 |
| 6,003,361 * | 12/1999 | Amin et al. ................................. 73/7 |
| 6,047,224 * | 4/2000 | Stover et al. ......................... 700/119 |

* cited by examiner

*Primary Examiner*—David A. Scherbel
*Assistant Examiner*—George Nguyen
(74) *Attorney, Agent, or Firm*—Hickman Coleman & Hughes, LLP

(57) ABSTRACT

A lapping guide for use in fabrication of a device includes a first resistive element and a second resistive element. The two resistive elements can provide different changing resistances throughout the lapping of the device. These two resistances can be used throughout the lapping of the device to facilitate determination of when a predetermined desired height of the device has been achieved, and therefore stop the lapping of the device. The resistive elements can be physically adjacent to each other or separate from each other. Further, a common lead can be electrically connected to both resistive elements for measuring their respective resistances. In addition, the resistive elements can be separated from each other by the device.

30 Claims, 14 Drawing Sheets

APPARATUS AND METHOD OF DEVICE STRIPE HEIGHT CONTROL

BACKGROUND OF THE INVENTION

This invention relates generally to magnetic recording, more particularly to magnetoresistive (MR) read heads, and most particularly to methods and structures for controlling the stripe height of the MR read heads. Those familiar with the art consider anisotropic magnetoresistive (AMR) read heads, giant magnetoresistive (GMR) read heads, and spin valve read heads to be included in the broader category of MR read heads. Subsequent reference to MR read heads is understood to encompass AMR, GMR, and spin valve devices. Merged inductive write, MR read heads comprise a specific exemplary application in all embodiments described in this invention.

Magnetic disk drives are used to store and retrieve data for digital electronic apparatuses such as computers. In FIGS. 1A and 1B, a magnetic disk drive 10 of the prior art includes a sealed enclosure 12, a disk drive motor 14, a magnetic disk 16, supported for rotation by a spindle S1 of motor 14, an actuator 18 and an arm 20 attached to a spindle S2 of actuator 18. A suspension 22 is coupled at one end to the arm 20, and at its other end to a read/write head or transducer 24. The transducer 24 typically includes an inductive write element with a magnetoresistive read element (shown in FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Various magnetic "tracks" of information can be read from the magnetic disk 16 as the actuator 18 causes the transducer 24 to pivot in a short arc as indicated by the arrows P. The design and manufacture of magnetic disk drives is well known to those skilled in the art.

FIG. 1C depicts a magnetic read/write head 30 including a write element 32 and read element 34. The edges of the write element 32 and read element 34 also define an air bearing surface ABS in a plane 33, which flies above the surface of the magnetic disk 16 during operation.

Read element 34 includes a first shield 44, an intermediate layer 38 which serves as a second shield, and a read sensor 46 located between the first shield 44 and the intermediate layer 38. The read sensor 46 has a particular stripe height, SH, and a particular location between the first shield 44 and the second shield 38, both of which are chosen to attain particular read performance. Control of stripe height is important in controlling device resistance, device output amplitude, device bias point and consequently many related measures of performance. MR sensors can be used with a variety of stripe heights, with a typical SH being smaller than about 2 microns, including less than 1 micron. Further, although the read sensor 46 is shown in FIG. 1C as a shielded single-element vertical read sensor, the read element 34 can take a variety of forms as is known to those skilled in the art, such as unshielded read sensors. The design and manufacture of magnetoresistive heads, such as read sensor 46, are well known to those skilled in the art.

Write element 32 is typically an inductive write element including the intermediate layer 38 which serves as a first yoke element or pole, and a second yoke element or pole 36, defining a write gap 40 therebetween. The first yoke element 38 and second yoke element 36 are configured and arranged relative to each other such that the write gap 40 has a particular throat height, TH. Also included in write element 32, is a conductive coil 42 that is positioned within a dielectric medium 43. As is well known to those skilled in the art, these elements operate to magnetically write data on a magnetic medium such as a magnetic disk 16.

The formation of a read/write head 30 begins with a wafer 50, as shown in FIG. 1D, which includes, formed over a substrate, sets of several layers or films of various materials that form an array of read/write heads (not shown), including the elements of the read/write head 30 that are shown in FIG. 1C. The wafer 50 is then divided into multiple slider bars 52 such that each slider bar 52 has a first cut surface, or edge, 54 and a second cut surface, or edge, 56 substantially parallel to each other. As can be better seen in FIG. 1E, each slider bar 52 may include several read/write heads 60 in series along the bar. For example, a typical slider bar may include about thirty (30) read/write heads 60. As is shown in FIG. 1E, the read/write heads 60 can be of different configuration, however, alternatively each of the write/read heads 60 along the slider bar 52 can be of approximately the same configuration.

As is shown in FIG. 1E, the second cut surface 56 is formed such that the read/write heads 60 extend through to the second cut surface 56. Thus, at the second cut surface 56, the read/write heads 60 are exposed and therefore available for removing material along the second cut surface 56 in a process termed lapping. Alternatively, the read/write heads 60 can extend to near the second cut surface 56, without being initially exposed. In such a case, the read/write heads 60 can become exposed and material can be removed therefrom during the lapping process.

The goal of lapping is to remove material from the second cut surface 56, which defines a lapping plane L, to form the ABS (also shown in FIG. 1C) of each of the read/write heads 60 in the plane 33. More particularly, it is the objective of the lapping process to define the ABS at a precise predetermined distance from the upper edge 64 of the read sensor 46 where the upper edge 64 is defined by wafer processes. In this way, the stripe As height SH of the read sensor 46 (shown in FIG. 1C) is defined substantially orthogonal to the lapping plane L, and the throat height TH is similarly defined substantially orthogonal to the lapping plane L. After lapping, the read/write heads are then each cut from the slider bar to form individual read/write heads.

FIG. 1F shows a typical lapping machine 70. The slider bar 52 is held along the first cut surface 54 by a jig 72. In turn, the jig 72 is contacted by pistons 74 at various bending points 76 along the length of the jig 72. Pistons 74 may be, for example, dual action air cylinders, and are configured to deflect the jig 72 at the bending points 76 by a particular amount. To obtain this particular amount, a controller 78 is used to regulate the operation of the pistons 74. The slider bar 52 is further oriented such that the second cut surface 56 lies substantially parallel to an upper surface 80 of a lapping plate 82. During lapping, an abrasive material, for example a diamond slurry, is introduced between the second cut surface 56 of the slider bar 52 and the upper surface 80 of the lapping plate 82. When the second cut surface 56 is brought into contact or near-contact with the upper surface 80, the slider bar 52 and the lapping plate 82 are moved relative to each other within the plane defined by the second cut surface 56 and the upper surface 80. This movement, along with the forces acting to press together the upper surface 80 and the second cut surface 56 and with the abrasive material placed therebetween, acts to abrasively lap the second cut surface 56 and thereby the read/write heads 60.

Because of the critical nature of the stripe height, SH, it is important to end the lapping process at the particular point which attains the correct stripe height. While lapping times, lapping pressures, and other lapping parameters could be standardized for particular types of slider bars 52, such a method can be ineffective due to fabrication variations such as in the deposition of materials of the read/write heads 60, or the wafer cut locations relative to the read/write heads. More particularly, some fabrication variations may exist within a single slider bar or a single wafer, with variations increasing with distance, while others may exist between different wafers (i.e., wafer-to-wafer variation). Therefore, it is beneficial for the controller to have some indication or feedback of the actual stripe height of the read sensor 46 during the lapping process.

FIG. 2A shows an example of a prior art electrical lapping guide (ELG) 90, that has been used to provide an indication of stripe height during the lapping process. FIG. 2A depicts a slider bar 52 in cross section at a layer including the read sensor 46, and associated leads 92. A "switch" 94, formed of a resistive element, and a resistive element 96 are electrically connected to the controller 78 through the leads 98 and 100, respectively. During the lapping process, a first current I1 passes through the switch 94, and a second current I2 passes through the resistive element 96. As the lapping occurs along the lapping plane L, and while the stripe height, SH, of the read sensor 46 is decreased, the height of both the switch 94 and resistive element 96 are both decreased. Over time during the lapping process, changes in the resistances Rs and Rr of the switch 94 and resistive element 96 respectively, due to the changing heights, can be detected by the controller 78. Such changes in resistance over time are shown in FIG. 2B.

Knowing the material properties and dimensions of resistive element 96 relative to material properties and dimensions of the read sensor 46, the measured resistance Rr during the lapping process can be used to calculate an approximate height of the read sensor 46 during the lapping process. Such a calculated height is shown over time in FIG. 2B by curve 110. Also, the initial height of the switch 94 is chosen such that the entire switch is lapped, thereby "breaking" the switch, before the target stripe height SHd of the read sensor is achieved. Because the height Hs of the switch 94 is known relative to the stripe height SH of the read sensor 46, the remaining stripe height of the read sensor 46 at the time the switch breaks, tsb, can be approximated. Thus, as is shown in FIG. 2B, the height calculated from Rr can be calibrated from the approximated read sensor stripe height at the time the switch breaks, tsb. The lapping process continues until the read sensor 46 stripe height SH is calculated to be approximately the target stripe height SHd at which time, $t_{end}$, the rate of the lapping process is changed and ultimately the lapping is ended.

Unfortunately, the switch 94 of the ELG 90 in FIG. 2A does not have a truly digital response, but rather the resistance Rs increases over time as shown in FIG. 2B. Also, measurement circuitry of a typical lapping system cannot easily measure a true open resistance. Thus, there is no easily ascertainable single precise point at which the switch "breaks" or is open, and therefore no precise indication of when the lapping has proceeded to the depth of the switch height for calibration purposes.

In addition, endpoint detection with such an ELG is limited by the measurement precision, with undesirable noise incorrectly indicating that the switch 94 is open, sometimes referred to as a false open indication. One technique to avoid such a false open indication is to place a resistive element in parallel with the switch 94, most typically with a resistance significantly greater than the initial resistance of Rs. The resistance signal detected at the controller will rise to an asymptote equal in value to this parallel resistive element as the switch opens. While a false open indication may be avoided, the resultant endpoint remains imprecise. Furthermore, because such an ELG provides calibration only around the points when the switch breaks, the ELG is ineffective for use in adjusting the lapping parameters throughout the lapping process. Also, the stripe height calculations and calibration of the stripe height calculation using the ELG 90 of FIG. 2A depends on knowing the relative dimensional and material properties of the ELG switch, resistive element, and leads, as well as the read sensor. Therefore, unknown differences in these properties due to fabrication variations can produce incorrect stripe height calculations and therefore incorrect termination of the lapping process, either too early or too late. Such imprecise determination will likely result in a read sensor 46 having an undesired stripe height and therefore substandard performance characteristics. For example, for a typical hard biased contiguous junction sensor, the measured resistance for both switch 94 and resistive element 96, as well as the read sensor 46, will include a leads resistance term and a junction resistance term in addition to the resistance of the switch 94, resistive element 96, or read sensor 46. Each of these terms is unknown because the dimensions of each feature and the sheet resistance of the respective films will vary across any given wafer, as well as throughout a population of wafers. Also, each of these terms is likely to vary with stripe height during lapping. To solve for all of these unknowns for each ELG on a slider bar would require the ability to generate the same number of equations, likely with the same number of calibration switches, and would rely on precise determination of each of the switch endpoints, as well as the measurement precision of each of the total resistance values. To attain such precision would entail an undesirably complex technique, and is therefore impractical.

As a further difficulty, slider bars are known to often have an inherent curvature once cut from the wafer. One objective in defining an air bearing surface is to correct for this condition because this correction is required so as to produce the tightest distribution of stripe height for the read sensors 46 positioned across the slider bar. In a typical embodiment, ELG 90 of FIG. 2A is distributed such that the switch 94 and resistive element 96 are at separate positions between sliders. Due to the unknown curvature of the slider bar, this separation increases the error in assuming that any switch 94 and a neighboring resistive element 96 have precisely known relative stripe heights and therefore results in additional calibration error. Therefore, using ELG 90 is not a satisfactory solution.

FIG. 3A shows another currently used electrical lapping guide (ELG) 120. Such an ELG includes a first resistive element 122 located along the lapping plane L and connected to the controller 78 through leads 124. Also included is a second resistive element 126 electrically connected to the controller 78 through electrical leads 128, but located distantly from the lapping plane L to act as an untapped reference device. A first current I1 and a second current I2 flow through the first resistive element 122 and through the second resistive element 126, respectively, both of which can be measured and monitored by the controller 78 during the lapping process. Further, the dimensions and material properties of the second resistive element 126 are chosen such that, at the point in the lapping process where the stripe height of a read sensor 46 will be equal to the target stripe height SHd, a resistance R1 of the first resistive element 122 is equal to or has some known relationship to a resistance R2 of the second resistive element 126. Thus, during the lapping process, as the stripe height of the read sensor 46 decreases, the height of the first resistive element 122 likewise decreases, thereby changing the resistance R1 measured across the first resistive element 122 as shown in FIG. 3B. Once the resistance R1 is detected to be approximately the same as the resistance R2, as shown in FIG. 3B at point E, the lapping process is stopped at $t_{end}$. While only two resistive elements are shown in FIG. 3A, multiple resistive elements can be used. In such ELGs, more than one resistive element can be used as an untapped reference device, providing additional resistance levels with which to determine tend.

Electrical lapping guides such as the ELG 120 of FIG. 3A are also affected by unknown variation in dimensional or material properties across the wafer. The prior art approach of placing a single resistive element between sliders is subject to error both due to dimensional and material properties variation across the wafer and is subject to errors due to bar curvature as previously discussed. Placing the second resistive element 126 in close physical proximity to the first resistive element 122 and designing second electrical leads 128 which are approximately identical to first electrical leads 124 will reduce the cumulative effect of these errors for this structure. Unfortunately, however, in such a modified ELG the dimensional error in defining the stripe height of second resistive element 126 translates directly as an error in targeting the stripe height of first resistive element 124. In effect, the reference during lapping of the bar is not based solely on the position of the upper edge of the respective resistive elements but is also subject to the position of the lower edge of second resistive element 126. Scaling such an ELG to reduce the percentage error in the physical dimensions can inherently invalidate the junction resistance term between the second electrical leads 128 and the second resistive element 126.

Thus, what is desired is an electrical lapping guide and method for controlling the stripe height of a device that is more accurate and results in a more precise determination of the device stripe height substantially throughout a process of lapping a read sensor or other device, while limiting cost and complexity. It is desired that such an ELG would provide a substantially continuous signal such that the stripe height may be determined throughout the process of lapping the read sensor. It is further desired that such an ELG utilize the upper edge of the resistive element as a calibration reference to minimize error. Also, it is desired that such an ELG be substantially insensitive to variation in dimensional and materials properties inherent in processing of the wafer.

SUMMARY OF THE INVENTION

The present invention provides a more precise determination of device stripe height during a lapping process, and thus results in more accurate stripe height control of a device processed with lapping. This is accomplished by providing an electrical lapping guide whose characteristics can be monitored substantially throughout the process of lapping a device and which is configured such that the effect of fabrication variations on device stripe height determination are minimized.

A lapping guide for use in fabrication of a device in accordance with the present invention includes a substrate, and two resistive elements on the substrate. In addition, the two resistive elements have different stripe heights, as defined on the wafer, due to an offset in the relative position of the upper edge of the resistive elements and resulting in different resistances. Further, the substrate has an edge defining a lapping plane, and the two resistive elements each have an edge along the lapping plane. Thus, when the edges of the two resistive elements are lapped, their resistances change and both are used, throughout lapping of the device, to determine when a device stripe height, which is measured substantially orthogonal to the lapping plane, is equal to a target device stripe height.

A process for forming an electrical lapping guide includes providing a substrate that includes a lapping plane. The process also includes forming, above the substrate, a device that intersects the lapping plane which thereby defines a first edge of the device. The device is formed with an initial height and an associated predetermined desired height. Also, above the substrate a first resistive element that is separate from the device is formed having a first resistance and an initial height that is larger than a difference between the initial and predetermined desired heights of the device. In addition, the first resistive element is formed intersecting the lapping plane, which thereby defines a first edge of the first resistive element. Above the substrate a second resistive element that is separate from said device is also formed, having a second resistance and an initial height that is larger than a difference between said initial and predetermined desired heights of the device. The second resistive element is also formed intersecting the lapping plane which thereby defines a first edge of the second resistive element. Additionally, the two resistive elements can have different resistances and can each be electrically connected to a common electrical lead. In this way, the ELG is formed so that the resistances of both resistive elements can be measured throughout a lapping process and used to determine a lapping endpoint using a minimum of external wiring and hardware.

In addition, a method for making a magnetoresistive head in accordance with the present invention includes lapping along a lapping plane of a slider bar which includes a magnetoresistive sensor and two resistive elements, the three of which are separate from each other. The two resistive elements each have an edge that is located along the lapping plane, and are each electrically connected to an electrical lead that is located between the two resistive elements. The method additionally includes passing a first current through one of the resistive elements and passing a second current through the other resistive element to measure different resistances across each resistive element, while the lapping continues. Further, the method includes using the two resistances to determine whether to change a rate of the lapping.

The various embodiments of the present invention enable more accurate control of the stripe height of a device by facilitating a more precise determination of the device stripe height throughout a lapping process. Further, this additional accuracy and precision are gained without increasing manufacturing time, cost, or complexity.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

FIGS. 1A–F, 2A–B, and 3A–B were discussed with reference to the prior art. FIGS. 4A–10 and related discussion below illustrate apparatuses and methods for providing an electrical lapping guide (ELG) that facilitates changing the rate of lapping a slider bar as a stripe height SH of a read sensor approaches a target stripe height SHd. More particularly, the ELG includes two resistive elements that continuously provide changing resistance signals from before and up to the time the target stripe height is reached.

Figure 1A:
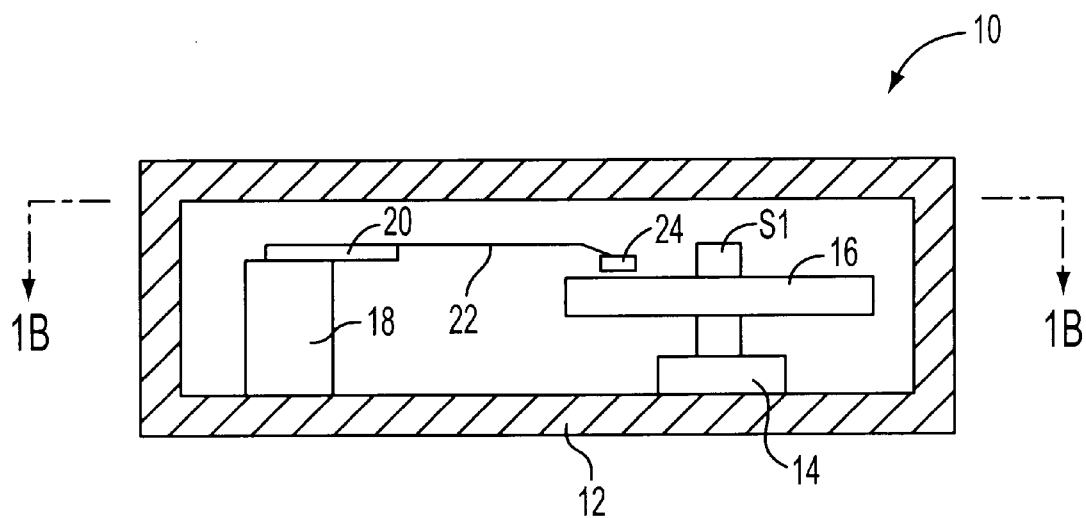
FIG. 1A is a partial cross-sectional front elevation view of a magnetic disk drive assembly.
Figure 1B:
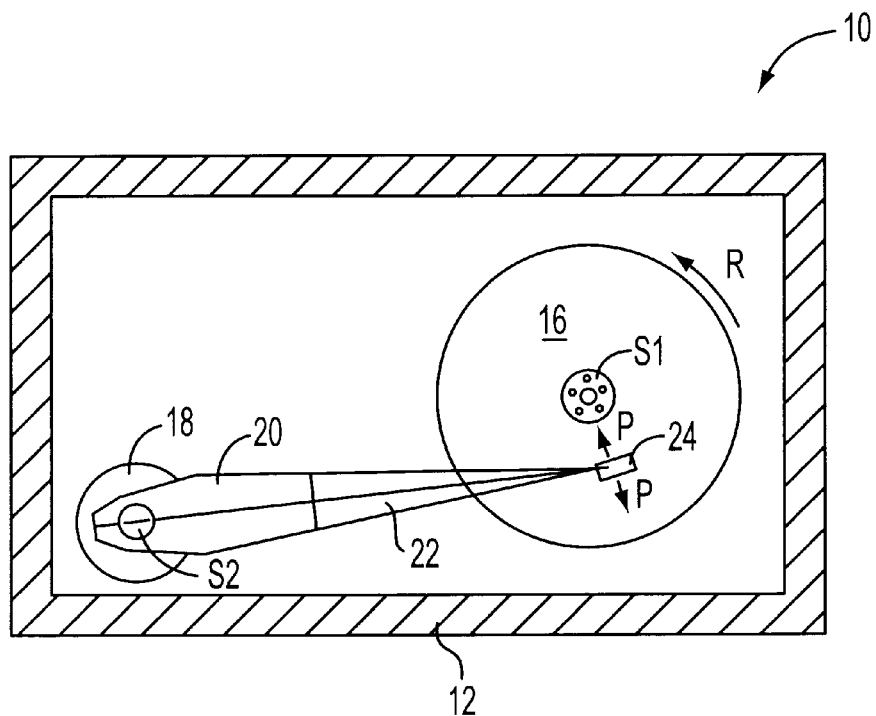
FIG. 1B is a top plan view taken along line 1B–1B of FIG. 1A.
Figure 1C:
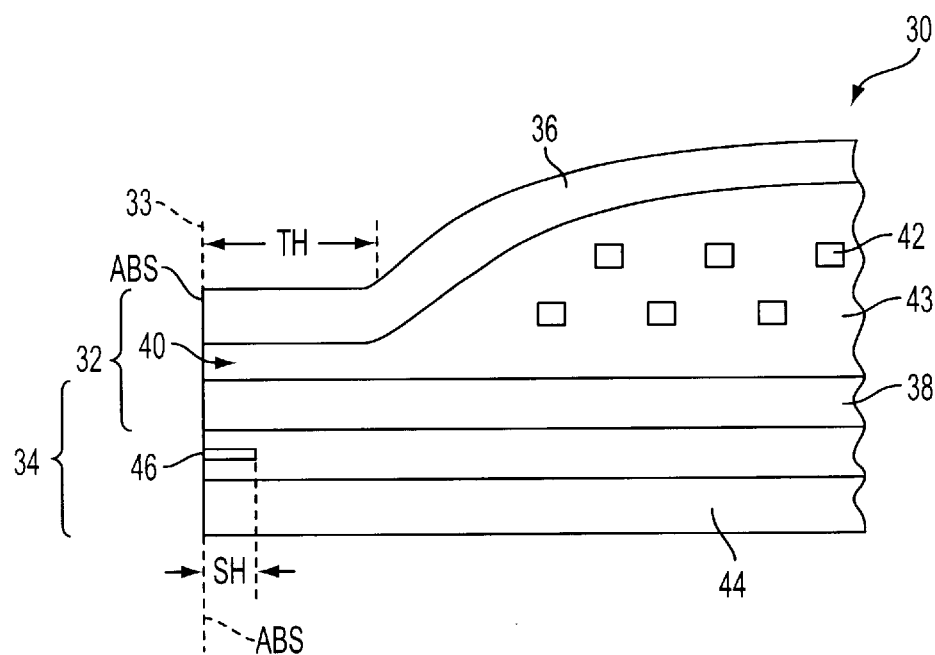
FIG. 1C is a cross-sectional side view of a read-write head incorporating a shielded magnetoresistive read sensor.
Figure 1D:
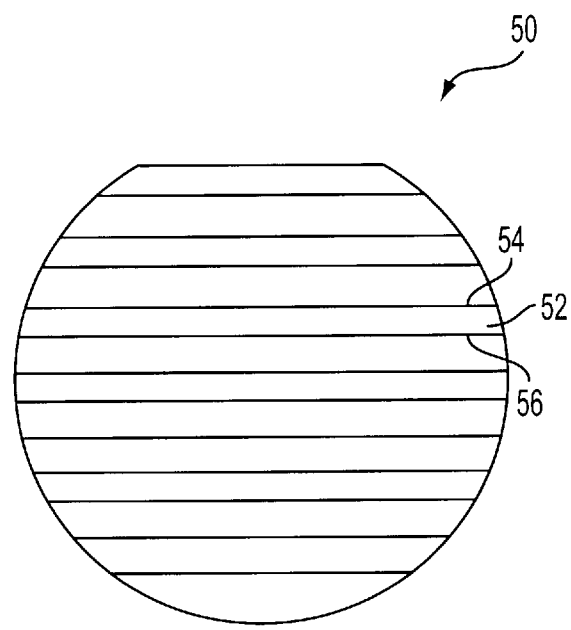
FIG. 1D is a plan view of a wafer including multiple slider bars that incorporate multiple read-write heads.
Figure 1E:
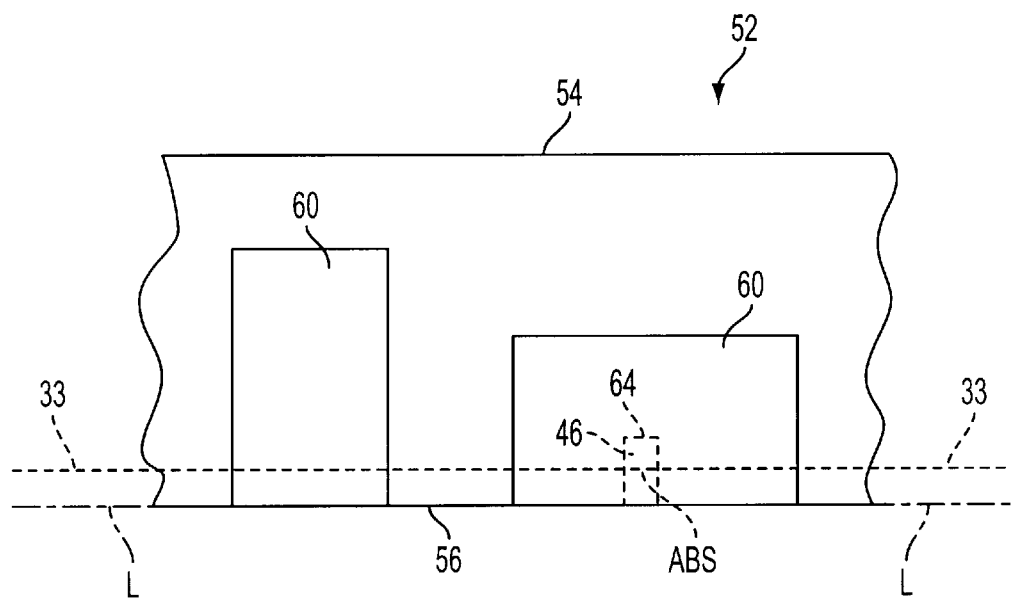
FIG. 1E is a partial plan view of an individual one of the slider bars shown in FIG. 1D.
Figure 1F:
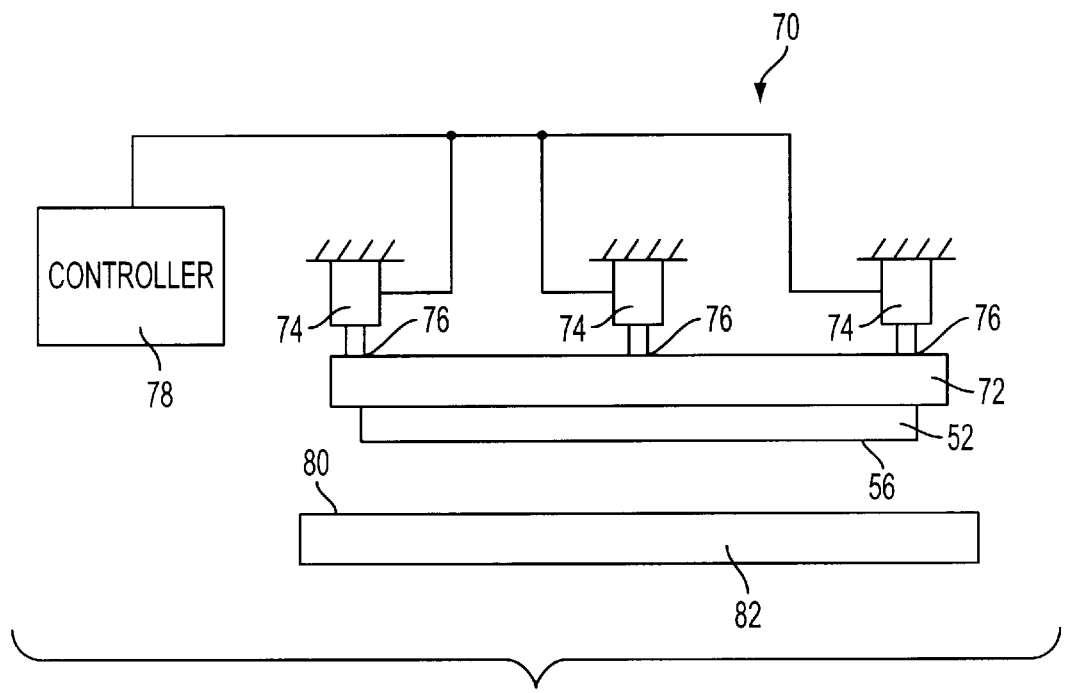
FIG. 1F is a schematic diagram of a lapping machine in which a slider bar is positioned.
Figure 2A:
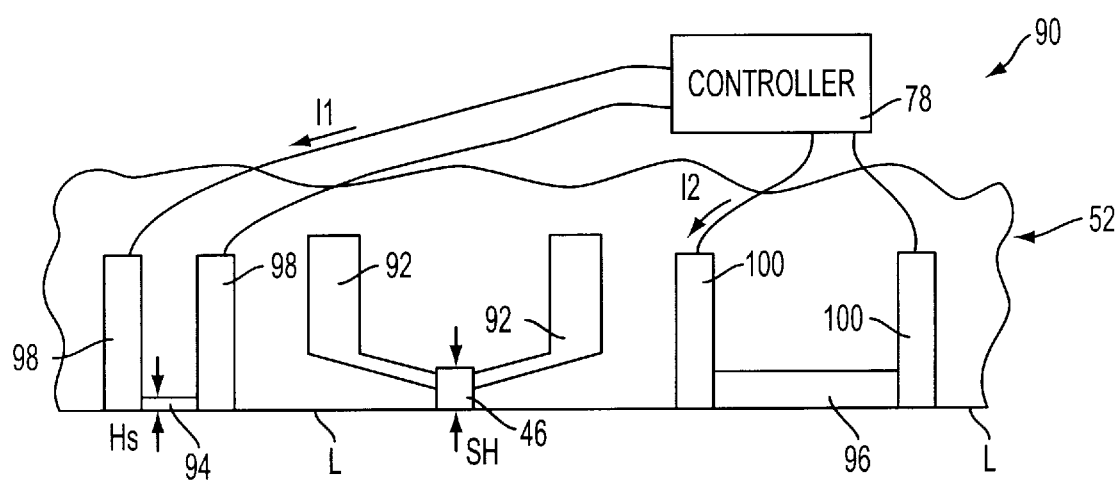
FIG. 2A is a partial cross-sectional plan view of a slider bar that incorporates a prior art electrical lapping guide and a read sensor.
Figure 2B:
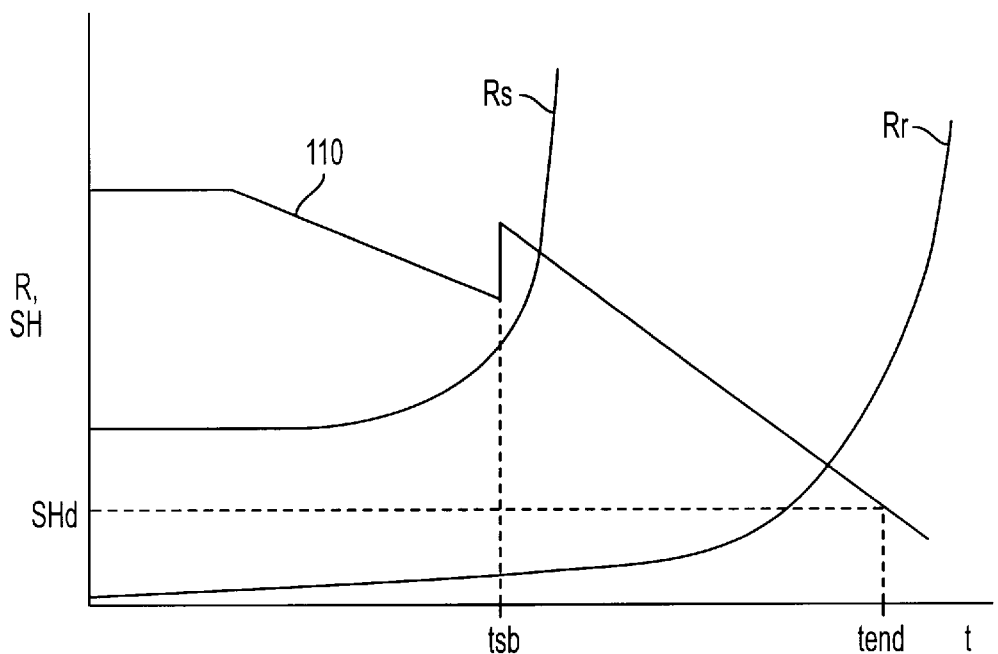
FIG. 2B is a graphical depiction of various physical characteristics of the electrical lapping guide and read sensor of FIG. 2A over time during a lapping process.
Figure 3A:
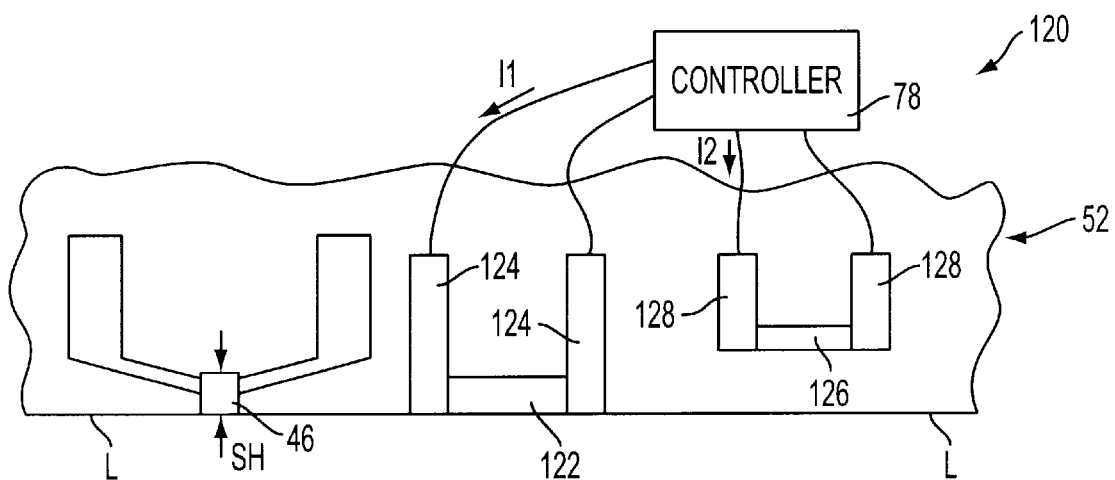
FIG. 3A is a partial cross-sectional plan view of a slider bar that incorporates another prior art electrical lapping guide and read sensor.
Figure 3B:
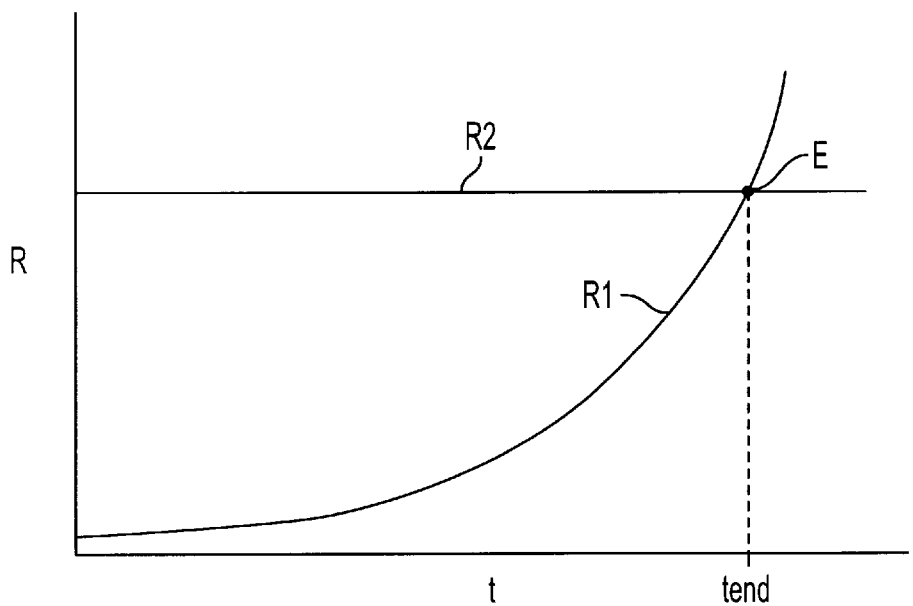
FIG. 3B is a graphical depiction of resistances in the electrical lapping guide over time during a lapping process.
Figure 4A:
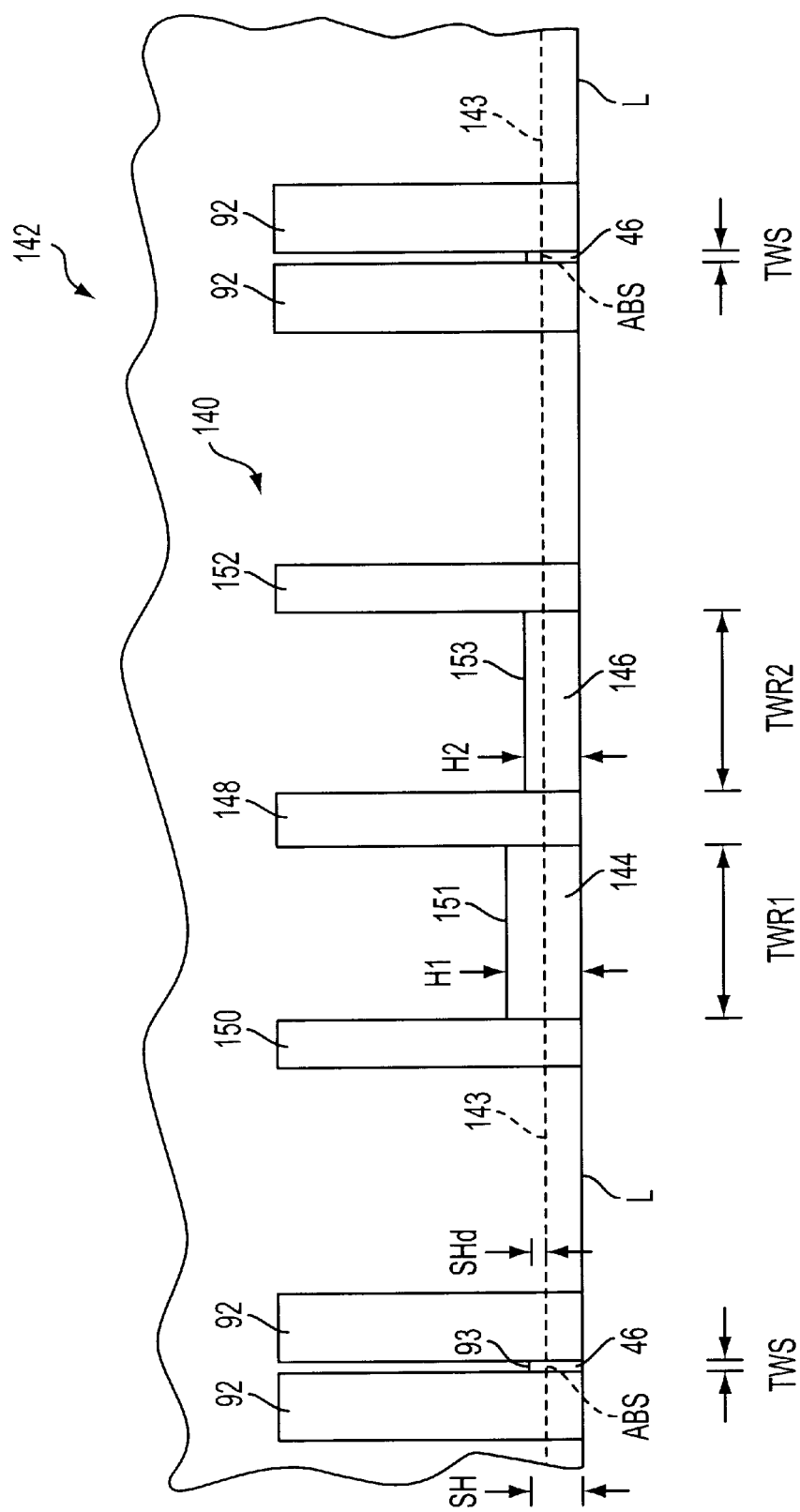
FIG. 4A is a partial cross-sectional plan view schematic of a slider bar that incorporates a read sensor and an electrical lapping guide according to an embodiment of the present invention.

FIG. 4A is a partial cross-sectional view of an electrical lapping guide (ELG) 140 according to an embodiment of the present invention, located near a device, specifically a read sensor 46 with leads 92, on a slider bar 142. Read sensor 46 may be a magnetoresistive read sensor, and is defined by a height, or stripe height, SH, and a trackwidth, TWS. As is shown, other read sensors may also be located on the slider bar near the ELG 140. Such proximity to the read sensors 46 minimizes fabrication (i.e., dimensional and material property) variations between the read sensors 46 and the ELG 140. In addition, other ELGs 140 (not shown) may be located along the slider bar 142 near other read sensors 46 (not shown).

As further shown in FIG. 4A, the ELG 140 includes a first resistive element 144, and a second resistive element 146 separated from the first resistive element 144 by a common lead 148, which is in electrical contact with both resistive elements. The first resistive element 144 and the second resistive element 146 also are electrically connected to a first electrical lead 150 and a second electrical lead 152, respectively. The leads 148, 150, and 152 are each electrically connected to a controller (not shown) through which currents can be applied to the first resistive element 144 and the second resistive element 146, and through which resistances of the first resistive element 144 and of the second resistive element 146 can be measured. Also, the first resistive element 144 and the second resistive element 146 are each defined by a particular height, H1 and H2, respectively, and by a particular width, or trackwidth, TWR1 and TWR2, respectively. It should be noted that because of the proximity of the first resistive element and second resistive element, during the lapping process, the two are lapped at essentially the same rate, and thus the relationship between H1 and H2 remains substantially the same. Although TWR1 and TWR2 are shown as approximately equal, and are so preferred, in some embodiments of the present invention they may be different. In either case, TWR1 and TWR2 are preferably substantially larger than TWS. The larger the size of TWR1 and TWR2, the less impact there is of other ELG components on endpoint determination, as is further discussed below. In addition, larger TWR1 and TWR2 minimize the impact on endpoint determination of trackwidth dimensional errors during the fabrication of the ELG resistive elements. For example, with appropriate dimensions, typical dimensional errors can result in about a 1% error, rather than a 10% error that can otherwise be experienced. For example, to obtain such benefits TWS can be about 1 micron or less, while TWR1 and TWR2 can be in the range of about 1 micron to about 100 microns, and preferably about 25 microns. The selection of particular TWR1 and TWR2 values is further influenced by the area available on a slider bar for the ELG versus the area occupied by read/write heads.

The read sensor 46 is also defined by a height, or stripe height, SH. At the wafer level, before a slicing operation has been performed to form a slider bar, the read sensor has a height SHw, while the first and second resistive elements have heights H1w and H2w, respectively. Once a slider bar has been formed, the sensor and first and second resistive elements have the respective pre-lapped initial heights SHi, H1i, and H2i. Of course, if the slicing operation does not cut through the device or element, the initial height will be substantially equal to the wafer-level height. Further, if the slicing operation does not cut through a resistive element, there will be no change in resistance of that resistive element until a lapping plane L reaches the lower edge of that resistive element.

During a lapping process, the slider bar 142 is lapped along the lapping plane L, over time reducing SH, along with H1 and H2, from the initial pre-lapped SHi, H1i, and H2i until SH is equal to a desired, or target stripe height SHd. It should be noted that when the read sensor, first resistive element, and second resistive element are formed of similar materials they will experience approximately the same lapping rates. Further, when they are located near each other along the slider bar, the differences between H1, H2, and SH will remain substantially constant throughout a lapping process.

To provide calibration before and up to the time the target stripe height is reached, initial lower edges of the resistive elements are below a final plane 143 which includes the read sensor ABS, and upper edges of the resistive elements are above the final plane 143. This criteria can be satisfied regardless of the position of the resistive element lower edges relative to the lower edge of the read sensor, and whether or not the initial lower edges of the resistive elements extend to the initial lapping plane. However, if the resistive elements do not extend to the initial lapping plane, the resistances will begin to change once the lapping plane L reaches the lower edges of the resistive elements.

However, it is preferred that the resistive elements provide a changing signal throughout the lapping of the slider bar, from the initial lapping plane to the plane 143 which includes the read sensor ABS. To ensure that the resistive elements are lapped from the initial lapping plane, and therefore begin to change resistance from that point, the lower edges of the resistive elements extend to the initial lapping plane, thereby allowing the resistive elements to be lapped from the beginning of the lapping process. To account for variations and tolerances of the slider bar slicing operation, it is preferable that the distance between the wafer level lower edges of the resistive elements and the plane 143 be greater than or equal to the distance between the plane 143 and the wafer level read sensor lower surface. However, with appropriate slicing of the slider bar to expose the first and second resistive elements, the wafer level lower surfaces of the resistive elements can alternatively be as close as or closer than the wafer level lower surface of the read sensor is to the plane 143.

To provide calibration until the lapping has formed the read sensor ABS (i.e., SH=SHd), the upper edges of the resistive elements extend above the plane 143, which includes the read sensor ABS. In other words, the distances between the initial lapping plane and the upper edges of the first and second resistive elements are greater than the distance between the initial lapping plane and the plane 143. Thus, for example, an SHw of about 16 microns can be lapped to an SHd of about 1 micron. In that case, the H1w could be about 19 microns, while H2w could be about 17 microns. While the absolute dimensions are somewhat affected by the tolerances of the slider bar slicing operation, it is preferable to have H1w and H2w be at least about 15 microns larger than the target stripe height SHd.

A goal during the lapping process is to change the rate of lapping as SH approaches the target stripe height SHd, including stopping the lapping at an endpoint when SH is approximately equal to SHd. At that time, tend, the lapping plane L is coincident with plane 143 and incorporates the air bearing surface ABS.

Figure 4B:
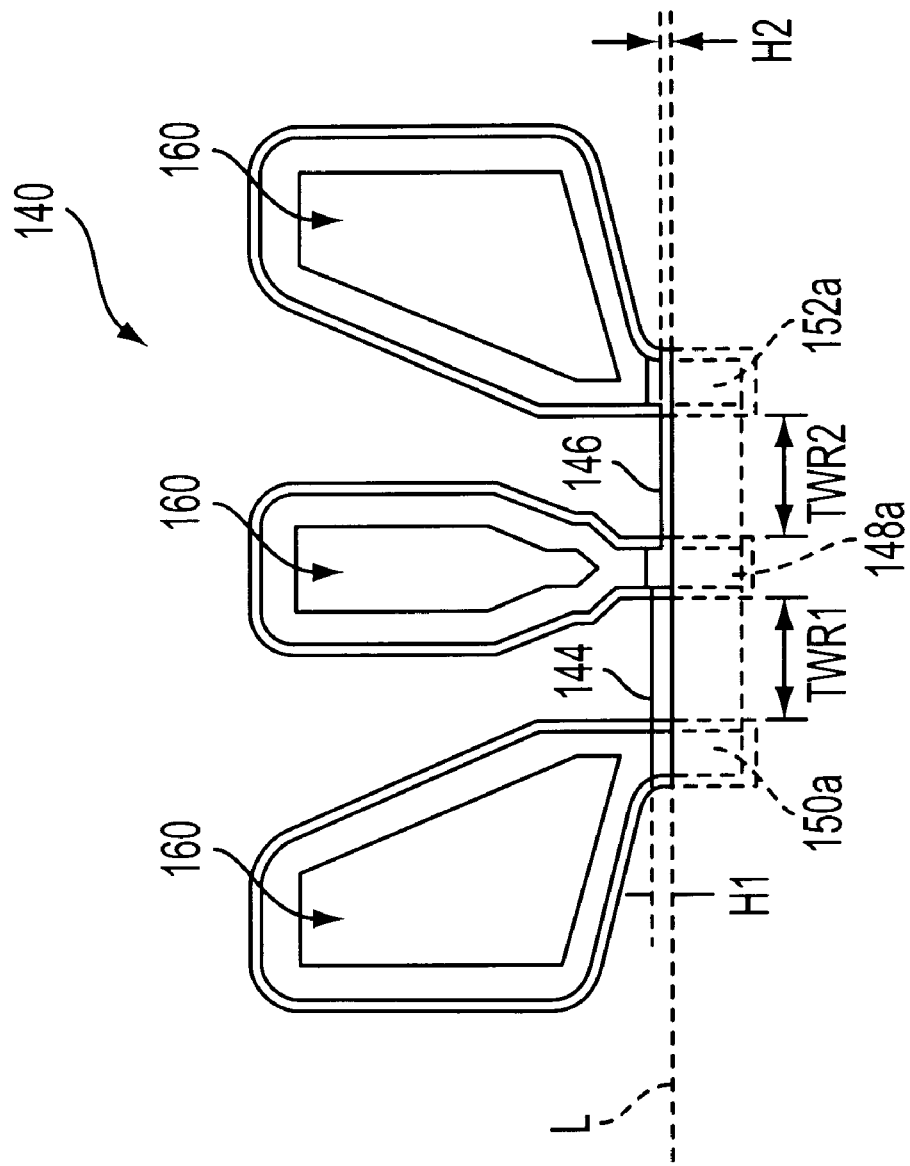
FIG. 4B is a partial cross-sectional plan view of the electrical lapping guide schematically depicted in FIG. 4A, according to an embodiment of the present invention.

FIG. 4B shows another partial cross-sectional view of the ELG 140 of the present invention. H1 is different from H2, and TWR1 is approximately equal to TWR2. Additional electrical connection elements (not shown) that facilitate electrical connection of the leads 148a, 150a, and 152a to a controller (not shown) can also be included.

Figure 4C:
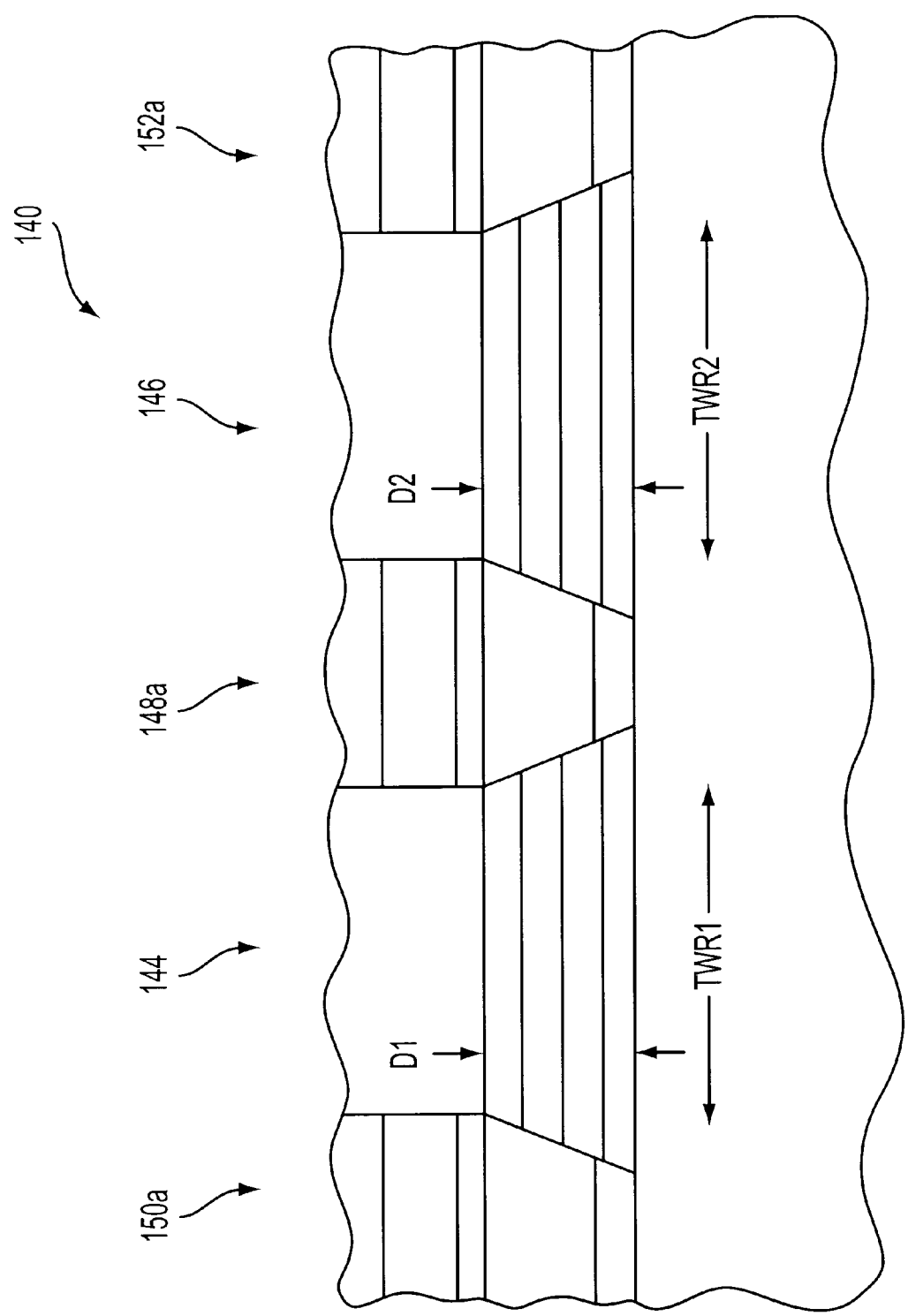
FIG. 4C is a partial cross-sectional elevation view of the electrical lapping guide depicted in FIG. 4B, according to an embodiment of the present invention.

FIG. 4C shows a partial schematic of the ELG 140 according to one embodiment of the invention, viewing the air bearing surface. The materials of the first and second resistive elements are the same. Also, preferably the first and second elements are formed of the same materials and at the same time as the formation of the read sensor 46, as this results in the minimum process complexity. Thus, the first and second resistive elements 144, 146 are formed of the same multiple layers, or films, in the same order and with the same method as used for the formation of a multi-layer read sensor 46 and thereby their respective depths D1 and D2 are substantially the same. The materials and order of such layers depend upon the desired characteristics of the finished read sensor 46. These layers are then patterned, for example by ion milling in conjunction with masks and patterned photoresist, to define the trackwidth and stripe height of the read sensor 46 (shown in FIG. 4A) and the first and second resistive elements 144, 146. The trackwidth typically will be defined by the longitudinal bias and thin film leads layers. While greater process complexity is required, in some embodiments first and second resistive elements 144, 146 can be defined in a film which differs from read sensor 46, but first and second resistive elements 144, 146 must be etched to define the trackwidth of the first resistive element simultaneously with the trackwidth of the second resistive element, and to define the stripe height of the first and second resistive element simultaneously with the stripe height of the read sensor 46. Subsequently, the read sensor and resistive elements are covered with dielectric material.

The dielectric material can be etched in subsequent processes, for example using masks and patterned photoresist, to form read sensor lead vias (not shown) and ELG lead vias 160 of FIG. 4B. Successive layers of conductive materials can be deposited and patterned to provide electrical continuity from the leads via to the desired location of the probe pads, as the read sensor connections are defined (not shown in FIG. 4B). These layers may be defined by many techniques including, but not limited to, vacuum deposition and liftoff or electroplating with a resist mask using appropriate conductive materials which may include gold and copper. In FIG. 4A, leads 92, 148, 150, and 152 are understood to be schematic representations of these combined structures. To save time and cost of processing, the leads 148, 150, 152 are preferably formed of the same materials as each other, and more preferably formed of the same materials and at the same time as the read sensor leads 92.

Figure 5:
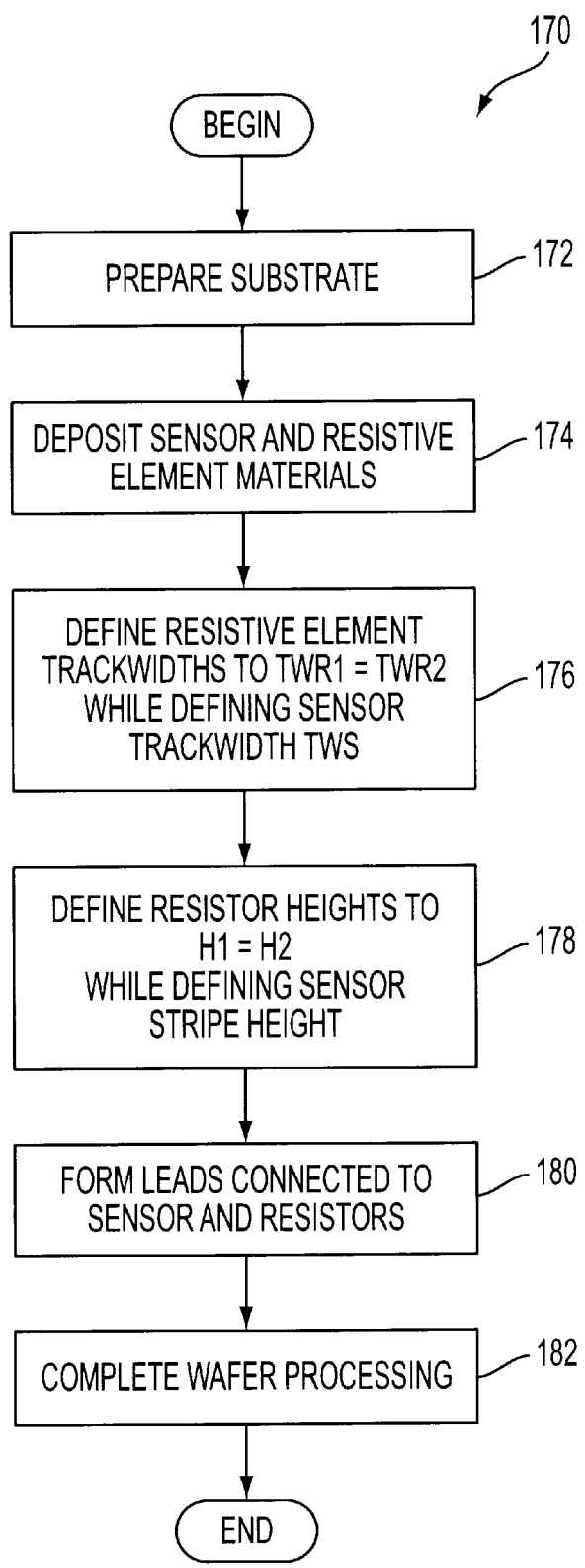
FIG. 5 is a flow chart of a process for forming an electrical lapping guide, according to another embodiment of the present invention.

A process 170 for forming an ELG according to another embodiment of the present invention can be more clearly understood from the flow chart shown in FIG. 5. The process 170 includes preparing a substrate in operation 172, which includes providing materials which form the first shield and first read gap, upon which read sensor materials and materials forming first and second resistive elements are deposited in operation 174. The same materials can be deposited for both the sensor and resistive elements, with layers of different materials being successively deposited when a multilayer read sensor is formed. In operation 176 the resistive element trackwidths TWR1 and TWR2 are defined as approximately equal to each other, and the read sensor trackwidth TWS is defined. Preferably, TWR1 and TWR2 are significantly larger than TWS. The resistive element heights H1 and H2 are also defined to be different from each other in operation 178. This difference preferably includes an offset in the locations of the upper edges of the first and second resistive elements and may include an offset in the positions of the lower edges of the first and second resistive elements provided that H1 and H2 are defined to be greater than the difference between the initial and target sensor stripe heights, SHw and SHd, to ensure that signals which vary with stripe height can be monitored from both resistive elements throughout the lapping process. Because a continuous signal is available substantially throughout, with appropriate lapping equipment lapping parameters can be adjusted continuously throughout the process as needed to appropriately lap the slider bar. For example, such capability enables the lapping to be completed at substantially the same time across the entirety of the slider bar, regardless of varying material properties or curvature across the slider bar. Further, the continuous signal substantially throughout enables such adjustments to be made precisely and early in the lapping process. Also advantageously, because the ELG resistive elements are not entirely lapped away, the target endpoint can be easily changed, within certain limits dependent upon H1 and H2. Thus, the same ELG design can be used for the fabrication of a variety of sensors having different target stripe heights SHd.

In addition, in operation 180 sensor leads electrically connected to the read sensor are formed. Also, a common lead electrically connected to and between the first and second resistive elements is formed, along with one additional lead per resistive element. For example, the common lead can be formed such that it is the only structure or material that lies between and within the same plane as the two resistive elements of the ELG, such as in a contiguous junction hard biased read sensor design. Alternatively, the first and second resistive elements can be physically contiguous, with the leads structures formed in a plane different than the two resistive elements (sometimes referred to as an overlay structure), such as in a typical exchange biased device or a non-contiguous junction hard biased device. More specifically, in such an alternative embodiment, the common lead could be formed having a surface contact with the two resistive elements in a region where the two are contiguous.

These leads can be formed in operation 180 from a single material or with multiple layers of different materials. For example, the ELG resistive elements (including, in some embodiments, a contiguous region in contact with the common lead) can be formed of the same materials with the same layering structure as the read sensor, thereby reducing fabrication complexity. To further reduce complexity, the ELG trackwidth, stripe height, and leads structures can be defined during the process steps which define the read sensor trackwidth, stripe height, and leads structures. The material deposition, definition of stripe height and trackwidth, and formation of electrical leads are performed using known methods such as chemical vapor deposition, physical vapor deposition, ion beam deposition, spin coating, reactive ion etching,-plasma etching, plating, and other methods known to those skilled in the art.

The process 170 also includes additional processing to complete the wafer in operation 182. Such processing can include the addition of a shield above the read sensor, as well as the inductive write element conductive coil and second yoke element (refer to FIG. 1C). Additionally, portions of the read sensor and ELG leads typically will be defined simultaneously with some of the inductive write element processes, in an embodiment having reduced complexity. Of course, while the process 170 can be performed in the order discussed above, the operations can alternatively be performed in other orders.

Figure 6:
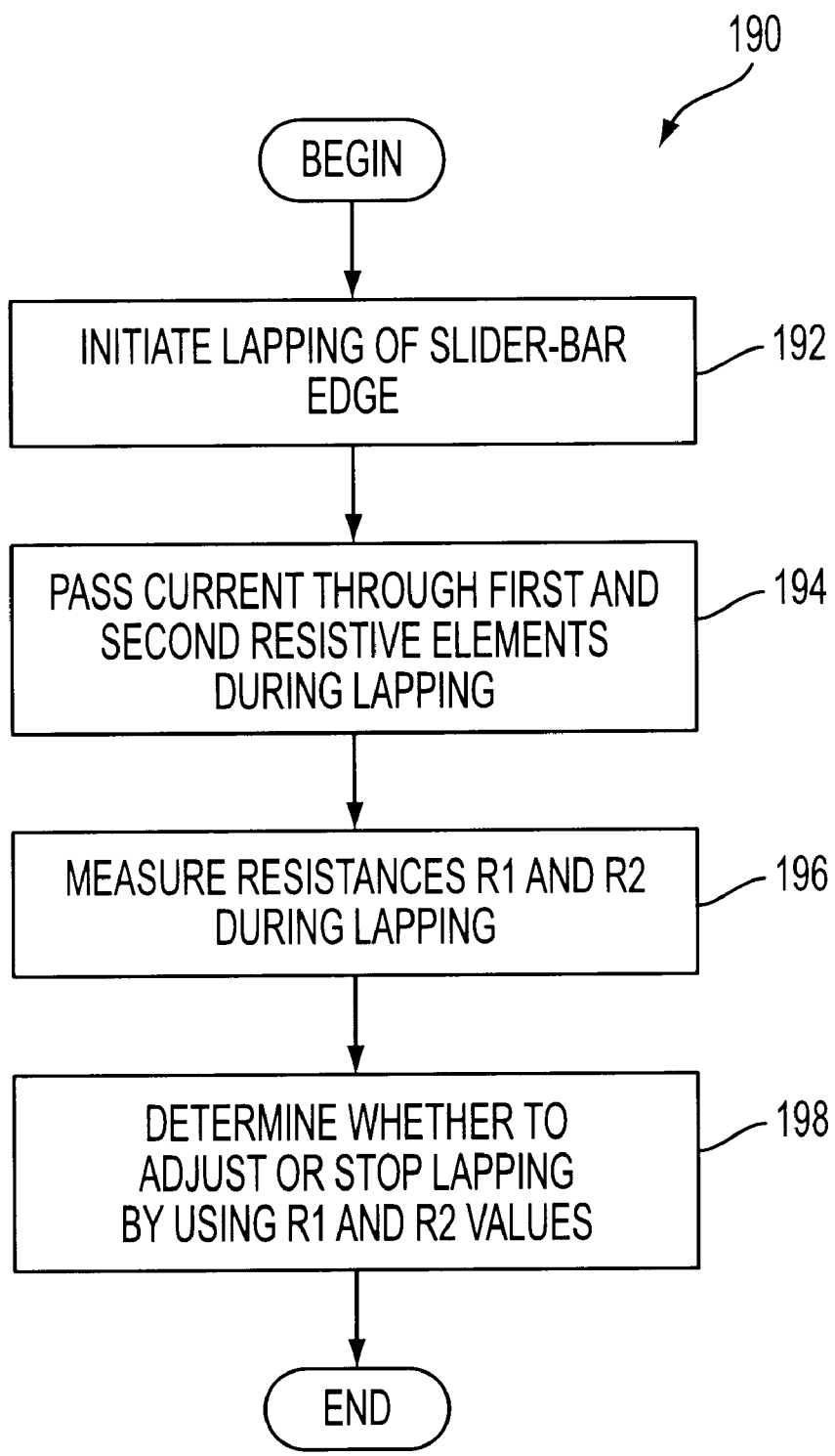
FIG. 6 is a flow chart of a method for controlling a read sensor stripe height during a lapping process, according to yet another embodiment of the present invention.
Figure 7:
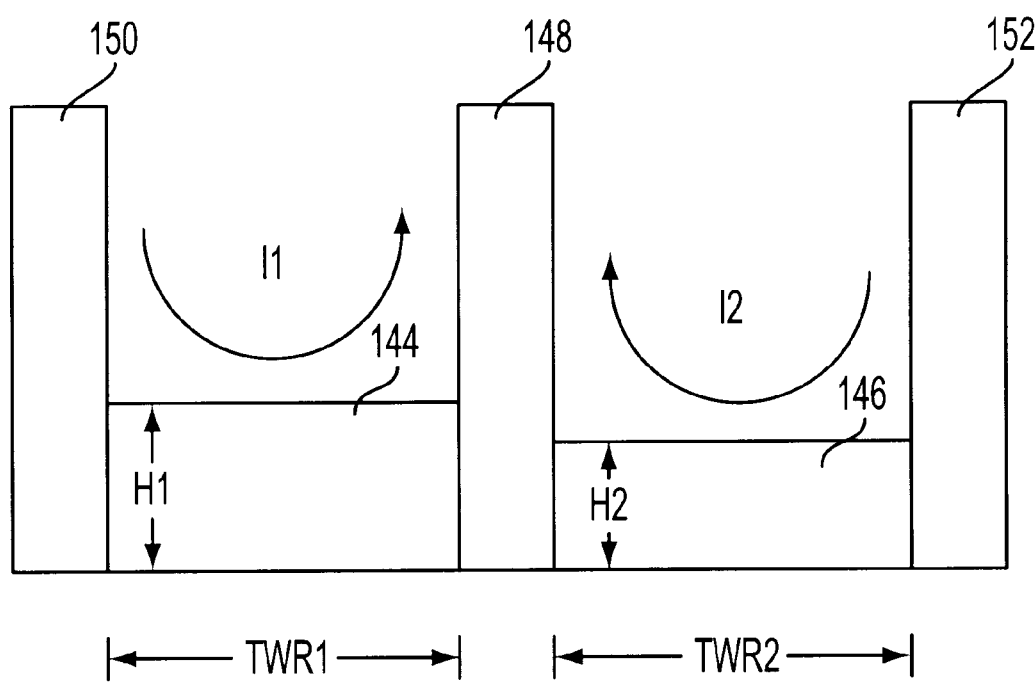
FIG. 7 is a schematic of current flowing through the electrical lapping guide shown in FIG. 4, according to an embodiment of the present invention.

FIG. 6 depicts a method 190 for using an electrical lapping guide, ELG, according to an embodiment of the present invention, to control a read sensor stripe height during lapping. Method 190 includes initiating the lapping of a cut edge of a slider bar that includes an ELG according to an embodiment of the present invention, in operation 192. While the lapping initiated in operation 192 continues, in operation 194 currents I1 and I2 are applied to the first and second resistive elements of the ELG. This is further illustrated in FIG. 7 with respect to first resistive element 144 and second resistive element 146. Referring again to FIG. 6, in operation 196, and while the lapping continues, the resistances R1 and R2 across the first and second resistive elements, respectively, are measured. Using the resistances R1 and R2 measured in operation 196, a controller, specifically configured for this method, determines whether to change the rate of lapping, including whether to stop the lapping in operation 198. Of course, while each of the operations 194–198 can be performed after lapping has been initiated, but before all lapping is completed, operations 194–196 can be performed after lapping is completed.

Figure 8:
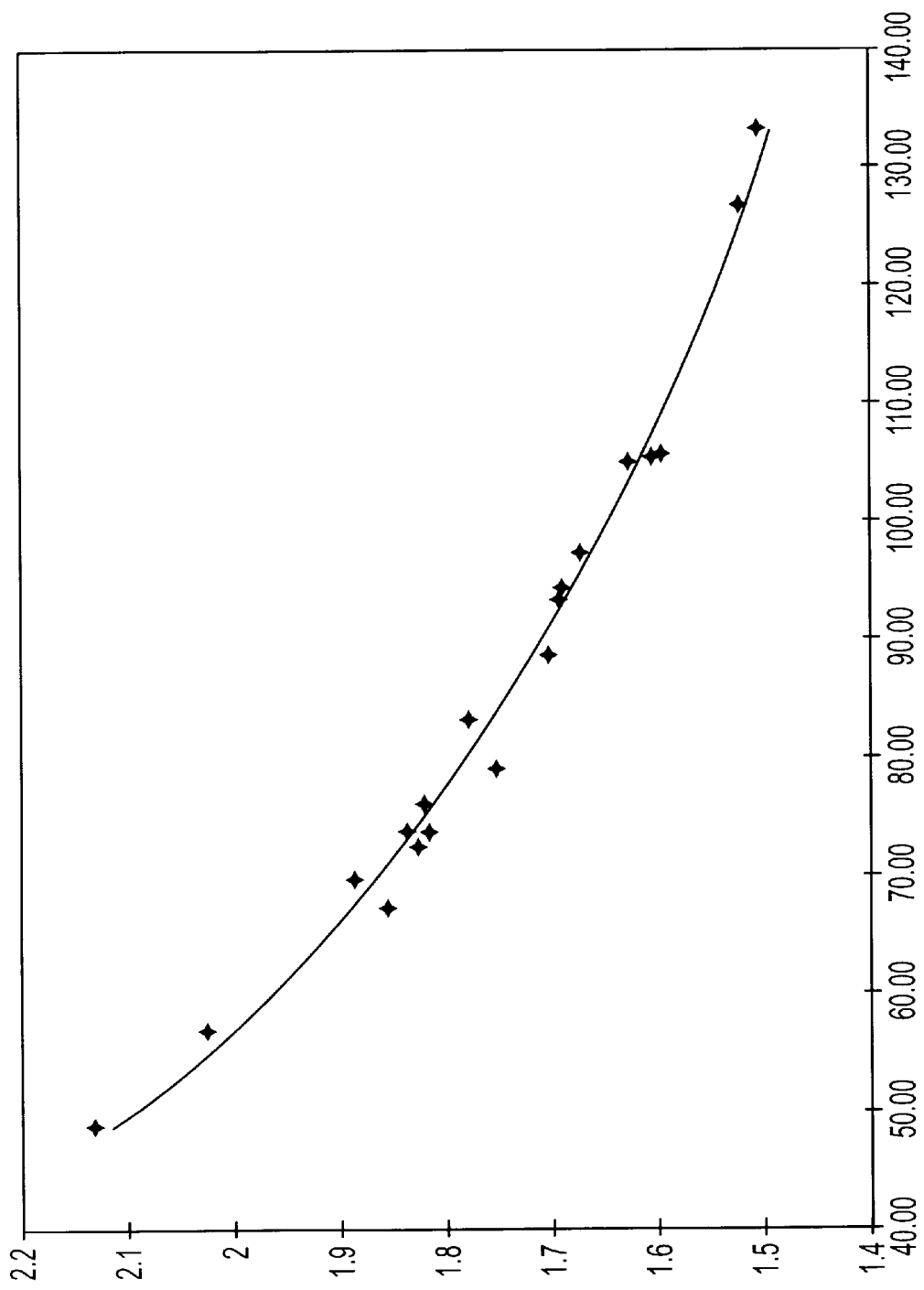
FIG. 8 is a graph of read sensor stripe height versus a resistance ratio of the electrical lapping guide during a lapping process, according to the yet another embodiment of the present invention.

The determinations in operation 198 are made when R1 and R2 are used to determine that the current stripe height of the read sensor is nearing or approximately equal to the target read sensor stripe height SHd. More specifically, for the ELG according to an embodiment of the present invention, when the material properties of the first and second resistive elements are approximately identical, the first and second resistive element trackwidths TWR1 and TWR2 are approximately equal, and the first and second resistive element initial (pre-lapping) heights H1i and H2i are different, then the ratio of the resistances R1 and R2 measured across the first and second resistive elements, respectively, is inversely proportional to the ratio of H1 and H2 at any given time during the lapping process. Thus, by knowing the difference in the relative position of the upper edges of the first and second resistive element and defining the wafer level stripe heights of the first and second resistive elements such that the lower edge of each resistive element will always reach the air bearing surface while lapping, the difference between H1 and H2 can be known for all times that H1 and H2 have positive values. By further knowing the difference between the read sensor initial stripe height and the initial height of one of either the first or second resistive element, the read sensor stripe height can be determined at any time during the lapping process. This relationship between the ratio of resistances and read sensor stripe height SH is illustrated in FIG. 8. As can be seen by the curve of FIG. 8, as SH decreases (i.e., is lapped away), the resistive element resistance ratio increases.

The method of determining whether to change the rate of or to stop the lapping (i.e., determine the endpoint) can be further understood from the following equations. When measuring resistances across elements of the ELG, a combined resistance throughout the particular path of the introduced current I1 or I2 is actually measured. The resistance of a first ELG element, Ree1, which is formed by the first resistive element, the common lead and the first electrical lead, and a second ELG element, Ree2, formed by the second resistive element, the common lead and the second electrical lead, are given by:

$$Ree1 = R1 + Rlc + Rll1 + Rjunct1,$$

and $$Ree2 = R2 + Rlc + Rll2 + Rjunct2$$

where Rlc is the resistance due to the common lead; Rll1 and Rll2 are the resistances due to the first and second electrical leads, respectively; and Rjunct1 and Rjunct2 are the resistances due to the junctions between the corresponding resistive elements and the leads.

Preferably, the leads and junctions are formed such that Rl1, Rl2, Rlc, Rjunct1, and Rjunct2 are negligible relative to R1 and R2. For example, the leads resistance is minimized by using low resistivity materials. The leads resistance can also be minimized by minimizing the distance over which the leads are formed only from the thin films utilized in read sensor fabrication by designing the via for contact between the thin films leads and the thicker conductors used in the write head process, in close proximity to the resistive elements. In addition, defining the trackwidths of the resistive elements to be substantially larger than the trackwidth of the sensor can minimize the relative impact of the leads and junction resistance because R1 and R2 are directly proportional to TWR1 and TWR2, respectively. For example, with a read sensor trackwidth of about 1 micron, TWR1 and TWR2 of the resistive elements in the range of about 10 microns to about 100 microns will increase the resistances of the ELG resistive elements by approximately one to two orders of magnitude with respect to the read sensor, resulting in R1 and R2 being the predominant terms in the ELG resistance. However, in some applications there may be little additional benefit to increasing TWR1 and TWR2 beyond a length of about 15 microns to about 30 microns, and 25 microns should result in good performance in most applications. Thus, Ree1 and Ree2 are reduced to R1 and R2, and thereby the ratio Ree2/Ree1 is reduced to the ratio R2/R1.

Also, the resistance of each resistive element is given by:

$$R1 = \frac{\rho 1 \, TWR1}{D1 \, H1} \quad \text{and} \quad R2 = \frac{\rho 2 \, TWR2}{D2 \, H2}$$

where p1 and p2 are the resistivities and D1 and D2 are the depths (refer to FIG. 4C) of the first and second resistive elements, respectively. The value of the ratio p/D could be estimated by an untapped reference structure formed of the same material or materials and with the same depth as the first and second resistive elements. However, given the structure of the present invention, p1/D1=p2/D2, so that $$\frac{R2}{R1} = \frac{TWR2 \, H1}{H2 \, TWR1},$$

and when TWR1=TWR2, $$\frac{R2}{R1} = \frac{H1}{H2}$$

Further, when the difference, x, between H1i and H2i is known, and when, at a particular point in time, the lapping rate of the first resistive element is approximately the same as the lapping rate of the second resistive element, then $$H1 = H2 + x$$

and thus $$\frac{R2}{R1} = \frac{H2 + x}{H2}$$

Solving for H2 yields $$H2 = x/((R2/R1) - 1).$$

In addition, when the difference, y, is known between SHi and H2i, and the slider bar is locally substantially flat upon completion of lapping, in effect the defined air bearing surface being parallel to the upper edge of the resistive elements, then $$SH = H2 + y.$$

Alternatively, the above equation can be written in terms of H1, rather than H2, in which case the difference, z, between SHi and H1i is used, where z is equal to the sum of x and y.

Due to the requirements for the read sensor, it may not be practical to meet the condition that Rjunct1 and Rjunct2 are negligible with respect to R1 and R2. Since Rjunct1 and Rjunct2 arise from the approximate edge to edge contact of a contiguous junction structure, Rjunct1 and Rjunct2 will vary in inverse proportion to stripe height during lapping. Similarly, the resistance terms Rl1, Rl2, and Rlc can be further separated into a fixed term, representing the leads structure above the first and second resistive elements, and a variable term representing the portions of the leads adjacent to the first and second resistive elements which also vary with stripe height during lapping. In this case Rl1 can be expressed as Rl1f+Rl1v, Fl2 can be expressed as Rl2f+Rl2v, and Rlc can be expressed as Rlcf+Rlcv, where Rl1f, Rl2f, and Rlcf represent the fixed component of Rl1, Rl2, and Rlc, respectively, and Rl1v, Rl2v, and Rlcv represent the component which varies in inverse proportion to stripe height of Rl1, Rl2, and Rlc, respectively. It is preferred that the fixed term of the leads resistance be designed to be approximately identical in some lapping control schemes and there is substantially no disadvantage to such a relationship in any control scheme. Since only Rl1f, Rl2f, and Rlcf are fixed and all other terms are inversely proportional to stripe height, it should be evident to those skilled in the art that when determining stripe height from the ratio of Ree2 to Ree1, it is a sufficient condition that Rl1f, Rl2f, Rlcf, and any external wiring resistance be negligible relative to the sum of the remaining terms and that the individual coefficients to express R1, R2, Rjunct1, Rjunct2, Rl1v, Rl2v, and Rlcv will cancel to yield a result identical to that obtained if these additional terms were assumed to be negligible.

If the design and material requirements for a given device make it impractical to design an ELG where Rl1f, Rl2f, and Rlc may be considered to be negligible, a well controlled process should allow for subtracting a constant F, which represents the nominal fixed resistance terms from the measured resistance before taking the ratio of resistances, yielding the modified equation for height of the second resistive element:

$$H2 = x/(((R2 - F)/(R1 - F)) - 1)$$

It is a sufficient condition that variation of the actual fixed resistance, Rl1f+Rlcf and Rl2f+Rlcf, from the assumed value F is negligible relative to the sum of the resistance terms which vary in inverse proportion to stripe height.

This method of the current invention is more accurate than in other systems of the prior art because the symmetry of the ELG lead design, proximity of the resistive elements to each other, shared common lead, and approximately equal trackwidth cause the calculation of read sensor stripe height to be minimally affected by most potential errors that would be caused by possible fabrication variations. In particular, the lapping endpoint is determined from only the differences in height between the resistive elements and the read sensor, obviating the need to consider terms that are difficult or impossible to determine or for which it is difficult or impossible to compensate. This difference in height is defined by the difference between upper edges 151 and 153 of the ELG resistive elements as shown in FIG. 4A. Because the resistive elements were defined at the same time as the sensor, the relationship between the resistive element upper edges 151, 153 and an upper edge 93 of the sensor is known and can be used as a reliable reference. Further, using R2/R1 produces a more linear response which facilitates signal monitoring and determination of the endpoint during lapping.

Figure 9:
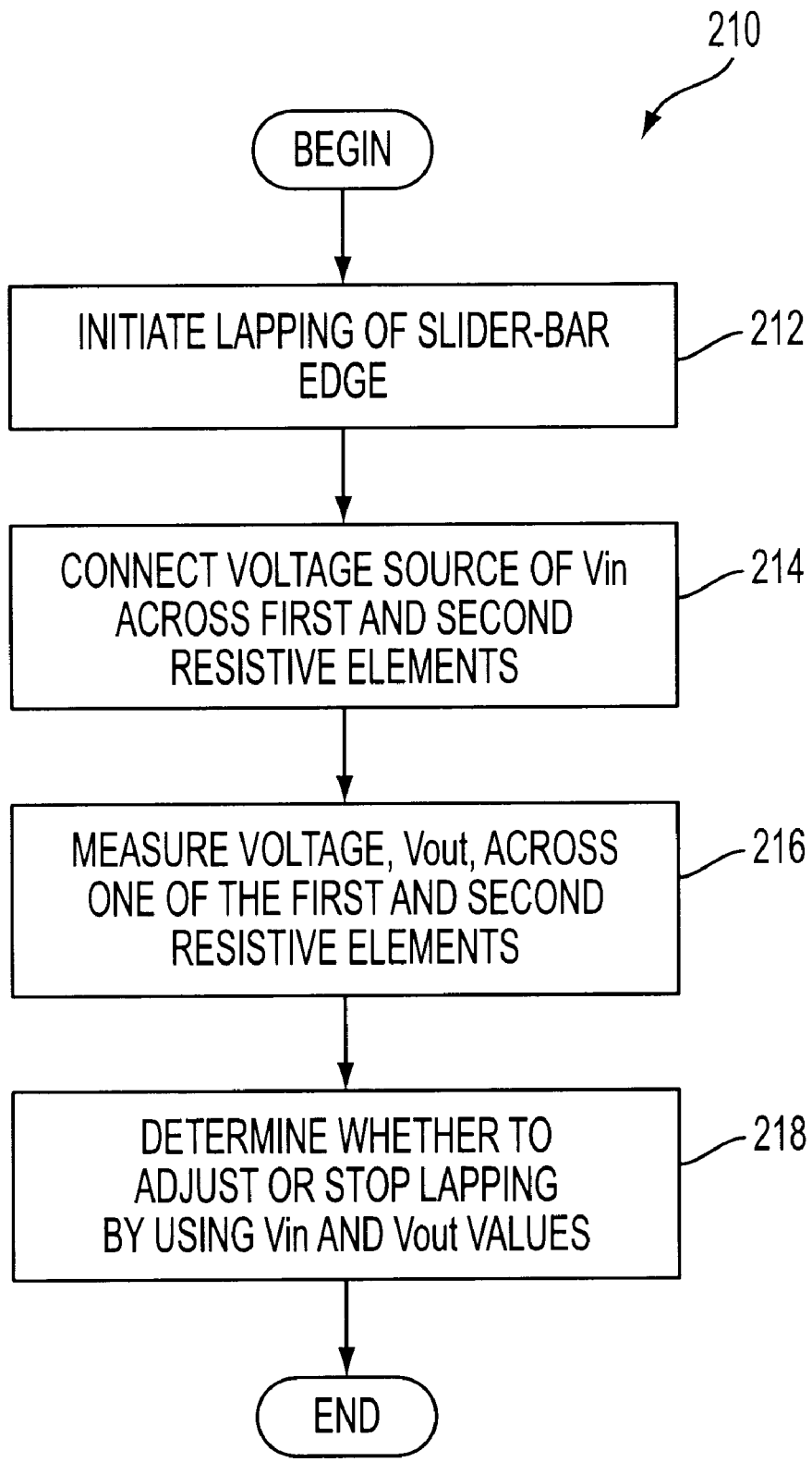
FIG. 9 is a flow chart of a method for controlling a read sensor stripe height during a lapping process, according to still yet another embodiment of the present invention.

According to another embodiment of the present invention, a method 210 for controlling stripe height using an ELG of the present invention, is shown by the process diagram of FIG. 9. After initiating lapping of a cut edge of the slider bar in operation 212, operation 214 involves the application of a known voltage source Vin across the first and second electrical leads 150, 152. In operation 216, a voltage Vout is measured at the common lead 148 located between the first and second resistive elements. In this way, the first and second resistive elements, combined with the additional resistance terms which are inversely proportional to stripe height, are used as a voltage divider. When the fixed term of the leads resistance is minimized with respect to the sum of the corresponding terms which vary in inverse proportion to stripe height, lapping can be controlled by measuring Vout and adjusting the lapping rate to achieve a balanced output voltage. Further, with the known voltage Vin, and measured voltage Vout, it can be determined in operation 218 whether to adjust the rate of lapping, including whether to stop lapping. Of course, while each of operations 214–218 can be performed after lapping has been initiated, but before all lapping is completed, operations 214–216 can be performed after lapping is completed.

Since Ree2>Ree1, it is preferable to ground the Rl2 contact and apply Vin to the Rl1 contact. When Vout is measured at the common Rlc terminal with circuitry with a sufficiently large input impedance, Rlc may be ignored in the equations for Vout. In the case where the fixed leads resistance Rl1f and Rl2f are two or more orders of magnitude less than the variable terms at the desired endpoint, the fixed leads resistance may be assumed to be negligible and Vout at this endpoint can be calculated from the desired H1 and H2, since the remaining resistive components are each inversely proportional to these heights.

In the simplest case where Rl1, Rl2, Rjunct1, and Rjunct2 are assumed to be negligible:

$$Vout = \frac{R2}{R1+R2} Vin$$

Since the present invention substantially assures that each of the terms which govern R1 and R2 are as identical as possible and each term is inversely proportional to stripe height, these terms cancel and this expression may be reduced to:

$$Vout = \frac{H2+x}{2H2+x} Vin \text{ or } Vout = \frac{H1}{H2+H1} Vin$$

where x is again the designed offset in the upper edge location of the first resistive element with respect to the second resistive element. Since the offset, y, from the upper edge of the read sensor element to the upper edge of the second resistive element, and the offset z=x+y from the upper edge of the read sensor to the upper edge of the first resistive element are also known from the design data, this expression can also be stated in terms of the read sensor stripe height SH:

$$H2 = SH + y$$

$$H1 = SH + x + y$$

$$Vout = \frac{SH + x + y}{2SH + x + 2y} Vin$$

Similarly, the above equation can be solved for the height of the second resistive element:

$$H2 = \frac{x((Vout/Vin) - 1)}{1 - (2Vout/Vin)}$$

and $$SH = \frac{x((Vout/Vin) - 1)}{1 - (2Vout/Vin)} - y$$

where x, y, and Vin are known for a given ELG design point and lapping process.

Although two different methods have been described to determine stripe height throughout a lapping process by using the two resistances R1 and R2, the same resistances R1 and R2 may also be used in conjunction with other methods. For example, when the ELG of the present invention is designed such that the fixed components of the leads resistance are substantially identical, the difference between total resistance Ree2 and Ree1 can be used, with appropriate manipulation, to determine the sensor stripe height SH throughout a lapping process. Advantageously, using this method substantially obviates a need for negligible leads resistance, because they can be designed to cancel out. Since this method results in an expression for the difference in resistance containing a second order term for stripe height, it may be more practical to utilize a control algorithm based on calculating an expected resistance difference at the desired read sensor stripe height. This method may result in reduced precision because it must rely on using resistance measurements taken before any portion of the ELG is modified by processing of the slider bar and must assume that the initial heights H1w and H2w of R1 and R2, as defined by wafer processes, are known. This may result in a calibration error of 1 to 5% depending on the initial height of the first and second resistive elements and the tolerance to which the initial heights are controlled. These initial resistance measurements Ree1w and Ree2w may be used to determine a coefficient, K, representing the variation of R1, R2, Rl1v, Rl2v, Rlcv, Rjunct1, and Rjunct2 with stripe height in terms of the difference Ree2w−Ree1w, the designed offset in height x, and the initial height H2w:

$$Ree2w-Ree1w = K((1/H2w) - (1/(H2w+x)))$$

or $$K = \frac{(Ree2w - Ree1w)(H2w(H2w+x))}{x}$$

Once this coefficient of variation with stripe height K is determined, the difference in resistance as a function of the height of the second resistive element may be expressed as:

$$Ree2 - Ree1 = Kx/(H2(H2+x))$$

since $$H2=SH+y,$$

$$Ree2-Ree1=Kx/(((SH+y)(SH+x+y))$$

When x and y are precisely known by design and K is empirically determined for each ELG from the initial resistance data, a target value for this resistance difference may be determined based on the desired final read sensor stripe height, SH.

It is further possible to estimate stripe height by using the initial resistance data, Ree2w and Ree1w, and the coefficient of variation with stripe height K to estimate the fixed portion of the leads resistance as follows:

$$(Rl2f+Rlcf)=Ree2w-(K/H2w)$$

and $$(Rl1f+Rlcf)=Ree1w-(K/(H2w+x))$$

These fixed leads estimates can then be used with the coefficient of variation with stripe height, K, to determine the final height of the resistive element based on the final resistance Ree2:

$$H2=K/(Ree2-(Rl2f+Rlcf))$$

$$H2=(K\ H2w)/(K+(Ree3-Ree2w)H2w)$$

and $$SH=y+(K\ H2w)/(K+(Ree2-Ree2w)H2w)$$

where the determination of K is subject to the precision with which H2w is known. This expression could also be used to estimate and control stripe height throughout the lapping process. If this technique is to be used for controlling lapping, it may be desired to introduce an offset in the position of the lower edge of the first resistive element with respect to the second resistive element, so that the offset in initial stripe height, H1w−H2w, will be greater than the offset, x, in the position of the upper edge of the first resistive element with respect to the upper edge of the second resistive element. In this case the coefficient of variation with stripe height, K, may be determined from a more general form of the prior equation:

$$K = \frac{(Ree2w - Ree1w)(H2w(H2w + (H1w - H2w)))}{(H1w - H2w)}$$

while the fixed resistance terms would be estimated as $$Rl2f=Ree2w-(K/H2w)$$

and $$Rl1f=Ree1w-(K/(H2w+(H1w-H2w)))=Ree1w-(K/H1w)$$

The subsequent calculations of H1, H2, or SH during lapping are unchanged from those discussed above.

Figure 10:
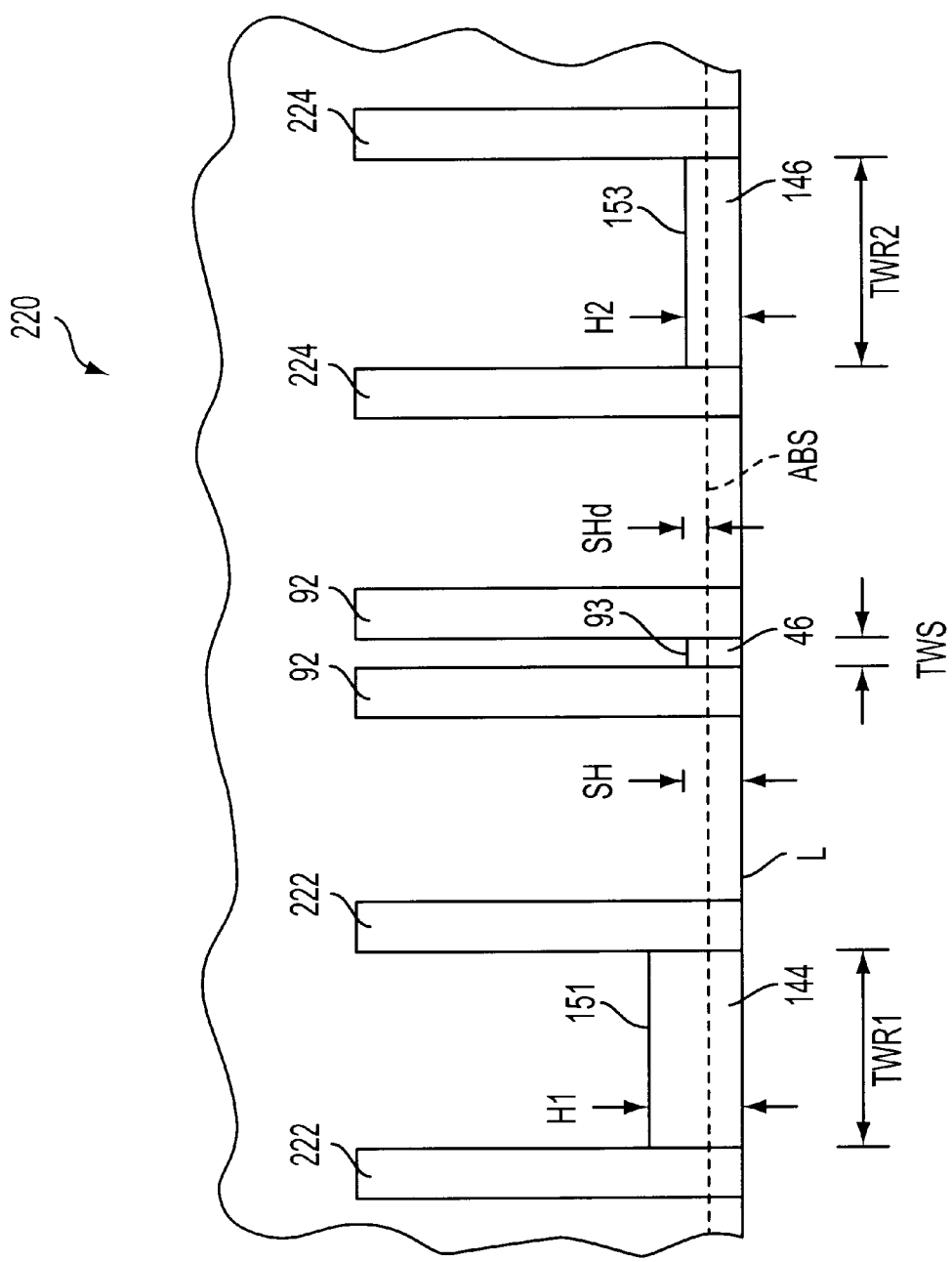
FIG. 10 is a partial cross-sectional plan view schematic of a slider bar that incorporates a read sensor and an electrical lapping guide according to another embodiment of the present invention.

The present invention can also be practiced with the first and second resistive elements located within the slider body without a common electrical lead between them. For example, in still yet another embodiment of the present invention, an ELG 220 can include the first resistive element 144 and second resistive element 146 disposed on opposite sides of the read sensor 46 as shown in FIG. 10. Because the two resistive elements are not disposed adjacent to each other, there is no common lead as was shown in FIG. 4A. Rather, the first resistive element is connected to a pair of leads 222 while the second resistive element is connected to a different pair of leads 224. As with the device of FIG. 4A, the resistances R1 and R2 of the two resistive elements can be monitored and mathematically manipulated to determine the changing read sensor stripe height and to modify the lapping rate accordingly. While this physical arrangement may result in a slight compromise to the assumption that the dimensions and material properties of the two resistive elements are identical, it advantageously increases the validity of the assumption that the offset in stripe height between the ELG resistive elements and the read sensor is controlled by the designed offset. Thus, the impact of any curvature in the slider bar is substantially eliminated, at least at the point of control. Another embodiment (not shown) could utilize each lead 92 as a lead shared with the respective adjacent resistive element. In such an embodiment, having each of the two resistive elements formed of a material different from that of the read sensor may be beneficial.

While the above embodiments of the present invention have been described using a first resistive element and second resistive element formed of the same material as the read sensor, and having the same trackwidths but different heights, other combinations of materials, trackwidths and heights that result in different resistances of the first resistive element and second resistive element could be used with appropriate modification of the above described method. For example, the first and second resistive elements can be formed of different materials and be patterned at the same time as the read sensor. Also, with appropriate modification of the above described structure and method, the various embodiments of the present invention described above can be used in conjunction with a read sensor in the form of an AMR, GMR, or spin valve read sensor. Further, whereas the above descriptions are with reference to a read sensor, the present invention can be utilized to more precisely control the stripe height of any device similarly situated relative to the electrical lapping guide of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A lapping guide for use in fabrication of a device having an initial stripe height that is to be reduced by a lapping process to a desired stripe height, said lapping guide comprising:

a substrate having an edge defining a lapping plane proximate to which said device is formed;

a first resistive element disposed above said substrate and having a first edge along said lapping plane and having a height that is greater than the difference between said initial stripe height and said desired stripe height of said device;

a second resistive element disposed above said substrate, having a resistance that is different than a resistance of said first resistive element, and having a first edge located along said lapping plane and having a height that is greater than the difference between said initial stripe height and said desired stripe height of said device, whereby when said first edge of said first resistive element and said first edge of said second resistive element are lapped, said resistance of said first resistive element and said resistance of said second resistive element change; and wherein said first resistive element has an upper edge that is distal from said lapping plane and that has a known location relative to an upper edge of said second resistive element that is distal from said lapping plane, wherein said location of said first resistive element upper edge and said location of said second resistive element upper edge are known relative to a location of an upper edge of said device that is distal from said lapping plane.

2. The lapping guide as recited in claim 1, further comprising:

a common electrical lead electrically connected to said first resistive element and said second resistive element.

3. The lapping guide as recited in claim 1, wherein said first resistive element is a portion of a first set of at least one film above said substrate and said second resistive element is a portion of a second set of at least one film above said substrate.

4. The lapping guide as recited in claim 1, wherein said first resistive element is larger than said second resistive element.

5. The lapping guide as recited in claim 1, wherein said first resistive element includes material having resistive properties that are different than material included in said second resistive element.

6. The lapping guide as recited in claim 4, wherein said first resistive element has a trackwidth defined by a length of said first edge of said first resistive element, that is approximately equal to a trackwidth of said second resistive element that is defined by a length of said first edge of said second resistive element.

7. The lapping guide as recited in claim 6, wherein a distance between said lapping plane and said upper edge of said first resistive element is different than a distance between said lapping plane and said upper edge of said second resistive element.

8. The lapping guide as recited in claim 7, wherein said first resistive element and said second resistive element are formed of substantially the same materials as each other and as said device, and wherein said first resistive element trackwidth and said second resistive element trackwidth are significantly greater than a trackwidth of said device.

9. The lapping guide as recited in claim 7, wherein said first resistive element and said second resistive element are formed of substantially the same materials as each other, and of different materials than said device.

10. The lapping guide as recited in claim 8, further comprising:

a common electrical lead electrically connected to said first resistive element and said second resistive element.

11. The lapping guide as recited in claim 10, wherein said first resistive element and said second resistive element are located proximate said device.

12. The lapping guide as recited in claim 4, further comprising a first electrical lead coupled to said first resistive element and a second electrical lead coupled to said second resistive element, whereby said resistance of said first resistive element and said resistance of said second resistive element can be measured when said first edge of said first resistive element and said first edge of said second resistive element are lapped.

13. The lapping guide as recited in claim 1, wherein a first edge of said device is located at said lapping plane.

14. The lapping guide as recited in claim 13, wherein said first resistive element and said second resistive element are located proximate said device.

15. The lapping guide as recited in claim 13, wherein said device is disposed between said first resistive element and said second resistive element.

16. The lapping guide as recited in claim 13, wherein said device is a magnetoresistive read sensor having a trackwidth defined by a length of said first edge of said magnetoresistive read sensor.

17. The lapping guide as recited in claim 13, wherein said device is a giant magnetoresistive (GMR) read sensor.

18. The lapping guide as recited in claim 13, wherein said device is a spin valve read sensor.

19. The lapping guide as recited in claim 16, wherein a trackwidth of said first resistive element, defined by a length of said first edge of said first resistive element, and a trackwidth of said second resistive element, defined by a length of said first edge of said second resistive element, are approximately equal to each other, and substantially larger than said trackwidth of said magnetoresistive read sensor.

20. The lapping guide as recited in claim 2, wherein said first resistive element has a second edge that is in electrical contact with said common electrical lead, said second resistive element has a second edge that is in electrical contact with said common electrical lead, and said second edge of said first resistive element is proximate and facing said second edge of said second resistive element.

21. A method for making a magnetoresistive head, said method comprising:

lapping along a lapping plane of a slider bar which includes a magnetoresistive sensor, a first resistive element having a first edge located along said lapping plane, and a second resistive element that is separate from said first resistive element, said second resistive element having a first edge located along said lapping plane, said first resistive element and second resistive element being electrically connected to an electrical lead that is located between said first resistive element and said second resistive element;

passing a first current through said first resistive element and passing a second current through said second resistive element to measure a first resistance across said first resistive element at substantially the same time as measuring a second resistance across said second resistive element while said lapping continues; and determining whether to change a rate of said lapping based upon said first resistance and said second resistance, whereby said first resistance is always different than said second resistance during said lapping process.

22. The method as recited in claim 21, wherein said determining whether to change said rate of said lapping includes using a calculated ratio of said first resistance to said second resistance and particular pre-lapping values to determine how much more of said magnetoresistive sensor is desired to be lapped.

23. The method as recited in claim 22, wherein said magnetoresistive sensor includes an unlapped edge that is distal said lapping plane, said first resistive element includes an untapped edge that is distal said lapping plane, said second resistive element includes an untapped edge that is distal said lapping plane, and wherein said particular pre-lapping values include a location of said sensor untapped edge relative to said first resistive element untapped edge and relative to said second resistive element untapped edge.

24. The method as recited in claim 21, wherein said determining whether to change said rate of said lapping includes using a calculated difference between said first resistance and said second resistance and using particular pre-lapping values to determine how much of said magnetoresistive sensor has been lapped.

25. The method as recited in claim 21, wherein said determining whether to change said rate of said lapping comprises:

applying a known input voltage across said first resistive element and across said second resistive element; and monitoring an output voltage from said electrical lead that is located between said first resistive element and said second resistive element.

26. The method as recited in claim 21, wherein said determining whether to change said rate of said lapping includes determining whether to stop said lapping.

27. An electrical lapping guide for assisting in lapping a device along a lapping plane until a time at which a height of said device is a desired predetermined device height, said electrical lapping guide comprising:

means for providing a first resistance substantially throughout said lapping, including at said time when said height of said device is said desired predetermined device height;

means for providing a second resistance that is different from said first resistance, substantially throughout said lapping, including at said time when said height of said device is said desired predetermined device height; and means for detecting said first resistance and said second resistance, said means for detecting being located between said means for providing said first resistance and said means for providing said second resistance.

28. The electrical lapping guide as recited in claim 27, wherein said means for providing said second resistance is located separately from said means for providing said first resistance.

29. The electrical lapping guide as recited in claim 27, wherein said means for providing said first resistance includes substantially the same material as said means for providing said second resistance, and a size of said means for providing said first resistance and a size of said means for providing said second resistance are different.

30. The electrical lapping guide as recited in claim 29, wherein a trackwidth of said means for providing said first resistance and a trackwidth of said means for providing said second resistance are substantially equal, and a height of said means for providing said first resistance is different from a height of said means for providing said second resistance.

* * * * *